United States Patent
Egashira

(10) Patent No.: US 10,972,533 B2
(45) Date of Patent: Apr. 6, 2021

(54) MANAGEMENT DEVICE FOR CONTROLLING SCALE-IN PROCESSING, COMPUTER-READABLE RECORDING MEDIUM STORING MANAGEMENT PROGRAM FOR CONTROLLING SCALE-IN PROCESSING AND MANAGEMENT METHOD FOR CONTROLLING SCALE-IN PROCESSING

(71) Applicant: FUJITSU LIMITED, Kawasaki (JP)

(72) Inventor: Yusuke Egashira, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 15/988,183

(22) Filed: May 24, 2018

(65) Prior Publication Data

US 2018/0343299 A1 Nov. 29, 2018

(30) Foreign Application Priority Data

May 29, 2017 (JP) .............................. JP2017-105181

(51) Int. Cl.
*H04L 29/08* (2006.01)
*H04L 29/06* (2006.01)
*G06F 9/455* (2018.01)
*G06F 16/27* (2019.01)
*G06F 16/2458* (2019.01)

(52) U.S. Cl.
CPC ...... *H04L 67/1004* (2013.01); *G06F 9/45558* (2013.01); *G06F 16/2471* (2019.01); *G06F 16/27* (2019.01); *H04L 65/105* (2013.01); *H04L 67/1008* (2013.01); *G06F 2009/45595* (2013.01)

(58) Field of Classification Search
CPC ....... H04L 47/70; H04L 47/74; H04L 47/741; H04L 67/10; H04L 67/1004
See application file for complete search history.

(56) References Cited

U.S. PATENT DOCUMENTS

| | | | | |
|---|---|---|---|---|
| 6,502,148 | B1 * | 12/2002 | Krum | H04L 67/10 709/208 |
| 10,210,027 | B1 * | 2/2019 | Rohde | G06F 9/547 |
| 2003/0163734 | A1 | 8/2003 | Yoshimura et al. | |
| 2007/0198768 | A1 | 8/2007 | Kim et al. | |
| 2008/0294872 | A1 * | 11/2008 | Bryant | G06F 9/5027 712/28 |
| 2009/0037427 | A1 * | 2/2009 | Hazlewood | G06F 16/278 |

(Continued)

FOREIGN PATENT DOCUMENTS

| | | |
|---|---|---|
| JP | 2002-163241 | 6/2002 |
| JP | 2003-248668 | 9/2003 |

(Continued)

*Primary Examiner* — Jeong S Park
(74) *Attorney, Agent, or Firm* — Staas & Halsey LLP

(57) ABSTRACT

A management device includes a memory and a processor configured to transmit a first instruction to proxy servers, receive, from each of the proxy servers, each of a plurality of expected completion times for each transaction executed by each of the proxy servers, perform a selection of a first proxy server corresponding to an earliest expected completion time among the plurality of expected completion times, and transmit a second instruction to the first proxy server so that the first proxy server executes scale-in processing when the transaction executed by the first proxy server ends.

16 Claims, 28 Drawing Sheets

(56) References Cited

U.S. PATENT DOCUMENTS

2012/0102185 A1     4/2012  Fernandes
2014/0173614 A1*    6/2014  Konik ................. G06F 9/45533
                                                          718/104
2014/0331235 A1*   11/2014  Lee ....................... G06F 9/5027
                                                          718/104
2016/0323377 A1*   11/2016  Einkauf .............. H04L 67/1076
2017/0010918 A1*    1/2017  Sato ....................... G06F 9/4881

FOREIGN PATENT DOCUMENTS

JP      2007-226802     9/2007
JP      2013-544562     12/2013

* cited by examiner

FIG. 3

```
BEGIN;
   SELECT * FROM t1;
   INSERT INTO t1;
COMMIT;
```

FIG. 20

| ITEM NUMBER | START TIME | END TIME | TRANSMISSION SOURCE | EXECUTION TIME PERIOD |
|---|---|---|---|---|
| 1 | 915148800.00 | 915148801.21 | AP1 | 1.21 |
| 2 | 915148800.13 | 915148800.29 | AP2 | 0.16 |
| 3 | 915148800.59 | 915148801.07 | AP3 | 0.48 |
| 4 | 915148801.57 | 915148802.11 | AP3 | 0.54 |

FIG. 21

| ITEM NUMBER | START TIME | END TIME | TRANSMISSION SOURCE | EXECUTION TIME PERIOD |
|---|---|---|---|---|
| 1 | 915148800.00 | 915148801.21 | AP1 | 1.21 |
| 2 | 915148800.13 | 915148800.29 | AP2 | 0.16 |
| 3 | 915148800.59 | 915148801.07 | AP3 | 0.48 |
| 4 | 915148801.57 | 915148802.11 | AP3 | 0.54 |
| <u>5</u> | <u>915148802.40</u> | | <u>AP1</u> | |

FIG. 22

| ITEM NUMBER | START TIME | END TIME | TRANSMISSION SOURCE | EXECUTION TIME PERIOD |
|---|---|---|---|---|
| 1 | 915148800.00 | 915148801.21 | AP1 | 1.21 |
| 2 | 915148800.13 | 915148800.29 | AP2 | 0.16 |
| 3 | 915148800.59 | 915148801.07 | AP3 | 0.48 |
| 4 | 915148801.57 | 915148802.11 | AP3 | 0.54 |
| 5 | 915148802.40 | 915148805.34 | AP1 | 2.94 |
| <u>6</u> | <u>915148803.30</u> | | <u>AP3</u> | |
| <u>7</u> | <u>915148804.80</u> | | <u>AP1</u> | |

FIG. 23

| ITEM NUMBER | START TIME | END TIME | TRANSMISSION SOURCE | EXECUTION TIME PERIOD |
|---|---|---|---|---|
| 1 | 915148800.00 | 915148801.21 | AP1 | 1.21 |
| 2 | 915148800.13 | 915148800.29 | AP2 | 0.16 |
| 3 | 915148800.59 | 915148801.07 | AP3 | 0.48 |
| 4 | 915148801.57 | 915148802.11 | AP3 | 0.54 |
| <u>5</u> | 915148802.40 | <u>915148805.34</u> | AP1 | <u>2.94</u> |

FIG. 24

| ITEM NUMBER | TRANSMISSION SOURCE | LONGEST EXECUTION TIME PERIOD |
|---|---|---|
| 1 | AP1 | 2.94 |
| 2 | AP2 | 0.16 |
| 3 | AP3 | 0.54 |

FIG. 25

| ITEM NUMBER | TRANSMISSION SOURCE | ELAPSED TIME PERIOD | EXPECTED COMPLETION TIME PERIOD |
|---|---|---|---|
| 1 | AP1 | 1.70 | 1.24 |
| 2 | AP2 | – | – |
| 3 | AP3 | 0.20 | 0.34 |

MANAGEMENT DEVICE FOR CONTROLLING SCALE-IN PROCESSING, COMPUTER-READABLE RECORDING MEDIUM STORING MANAGEMENT PROGRAM FOR CONTROLLING SCALE-IN PROCESSING AND MANAGEMENT METHOD FOR CONTROLLING SCALE-IN PROCESSING

CROSS-REFERENCE TO RELATED APPLICATION

This application is based upon and claims the benefit of priority of the prior Japanese Patent Application No. 2017-105181, filed on May 29, 2017, the entire contents of which are incorporated herein by reference.

FIELD

The embodiments discussed herein are related to a scale-in technique.

BACKGROUND

In a business system using a database (hereinafter also referred to as an information processing system), for example, a business operator which provides a service to a user (hereinafter, also simply referred to as a business operator) constructs a business system including a database storing data used for provision of the service.

The above-described business system includes, for example, a plurality of databases storing respective pieces of data synchronized with each other and a database-connected proxy server (hereinafter, also simply referred to as a proxy server) which distributes a query transmitted from an application to any one of the databases. In this case, the proxy server analyzes the content of a query accepted from an application and identifies a database to handle the query based on a result of the analysis. The proxy server distributes the query transmitted from the application to the identified database. This allows the business operator to perform database load balancing.

For example, Japanese Laid-open Patent Publication No. 2002-163241, Japanese Laid-open Patent Publication No. 2003-248668, Japanese National Publication of International Patent Application No. 2013-544562, and Japanese Laid-open Patent Publication No. 2007-226802 disclose related art.

SUMMARY

According to an aspect of the invention, a management device includes a memory and a processor configured to transmit a first instruction to proxy servers, receive, from each of the proxy servers, each of a plurality of expected completion times for each transaction executed by each of the proxy servers, perform a selection of a first proxy server corresponding to an earliest expected completion time among the plurality of expected completion times, and transmit a second instruction to the first proxy server so that the first proxy server executes scale-in processing when the transaction executed by the first proxy server ends.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for explaining the functions of the virtual machines running on the information processing apparatus;

FIG. 20 is a chart for explaining a specific example of execution time period information;

FIG. 21 is a chart for explaining the specific example of the execution time period information;

FIG. 22 is a chart for explaining the specific example of the execution time period information;

FIG. 23 is a chart for explaining the specific example of the execution time period information;

FIG. 24 is a chart for explaining a specific example of longest execution time period information;

FIG. 25 is a chart for explaining a specific example of expected completion time period information;

DESCRIPTION OF EMBODIMENTS

For example, if processing requests transmitted from users increase in a business system, the number of queries transmitted from applications to a proxy server increases, and a processing load on the proxy server increases. For this reason, in the business system, limits of processing ability in the proxy server may become a bottleneck in processing depending on the amount of processing requests transmitted from users.

Under the circumstances, a business operator implements, for example, a function of performing proxy server scale-out (hereinafter also referred to as scale-out processing) and scale-in (hereinafter also referred to as scale-in processing) in a business system. This allows the business system to increase the number of proxy servers, for example, if the number of queries transmitted from applications increases. The business operator is thus capable of inhibiting a proxy server from becoming a bottleneck in the business system.

In the business system, when scale-in for a proxy server is to be performed, proxy server scale-in is desirably started after all connections going through a proxy server targeted for scale-in are cut off to inhibit a transaction in execution being adversely affected. For this reason, the business system determines, for example, a proxy server with the fewest connections going therethrough as the proxy server targeted for scale-in.

However, a proxy server with the shortest time period taken to cut off all connections going therethrough does not necessarily coincide with a proxy server with the fewest connections going therethrough. For this reason, if the proxy server with the fewest connections going therethrough is determined as the proxy server targeted for scale-in, the business system may be incapable of quickly performing scale-in for the proxy server.

[Configuration of Information Processing System]

Figure 1:
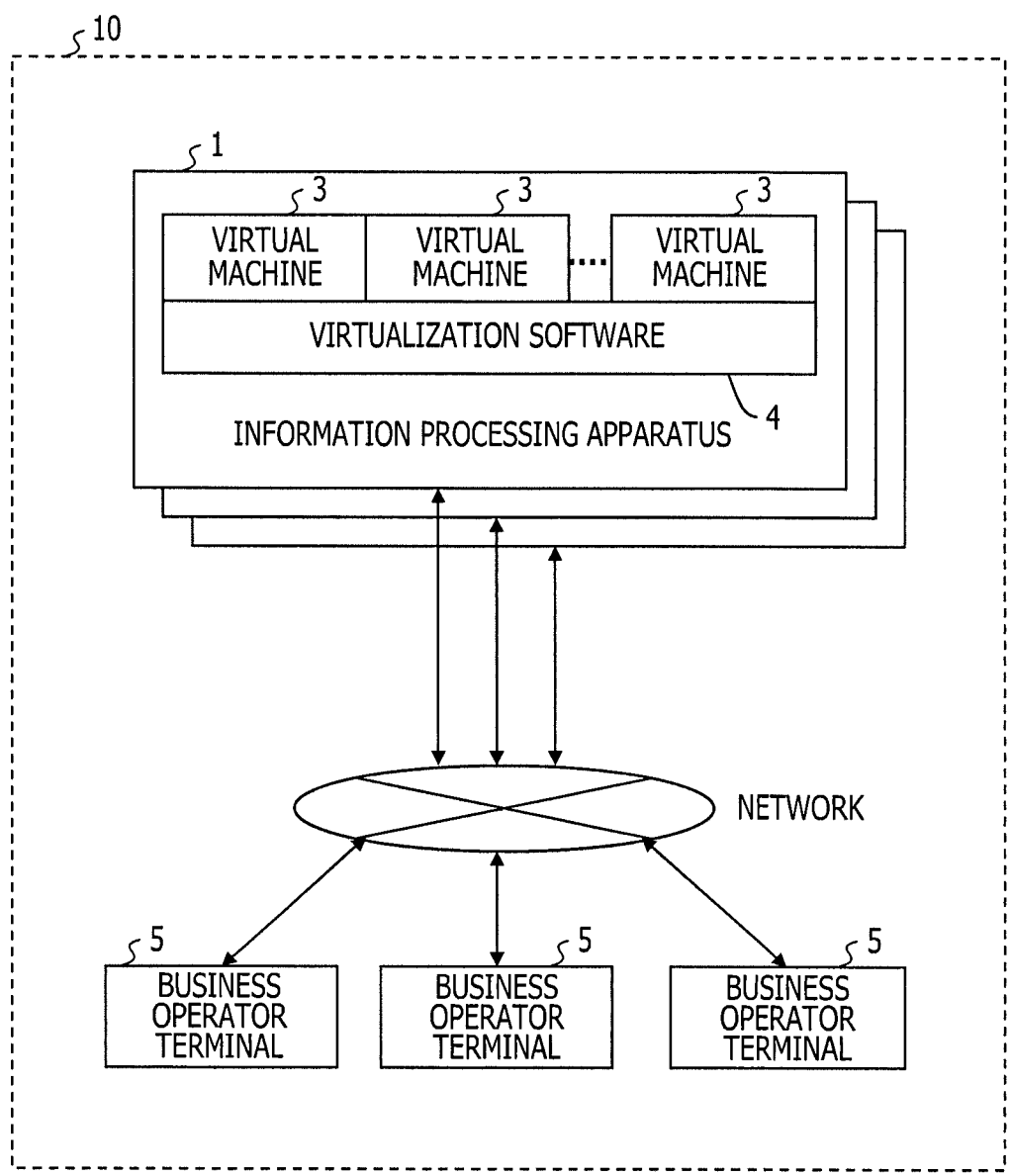
FIG. 1 is a diagram illustrating an overall configuration of an information processing system.

FIG. 1 is a diagram illustrating an overall configuration of an information processing system 10. The information processing system 10 illustrated in FIG. 1 is, for example, a business system for providing a service to a user. In the information processing system 10 illustrated in FIG. 1, information processing apparatuses 1 are provided inside a data center (not illustrated). A business operator terminal 5 is accessible to the data center via a network, such as the Internet or an intranet.

The information processing apparatuses 1 are composed of, for example, a plurality of physical machines. Each physical machine includes a central computing unit (CPU), a memory (dynamic random access memory (DRAM)), and a large-capacity memory, such as a hard disk (hard disk drive (HDD)). Physical resources of the information processing apparatus 1 are allocated to a plurality of virtual machines 3 which execute processes for providing services to users.

Virtualization software 4 is a piece of infrastructure software which runs the virtual machines 3 by allocating the CPU, the memory, and the hard disk of the information processing apparatus 1. The virtualization software 4 runs on, for example, the information processing apparatus 1.

[Functions of Virtual Machines Running on Information Processing Apparatus]

Figure 2:
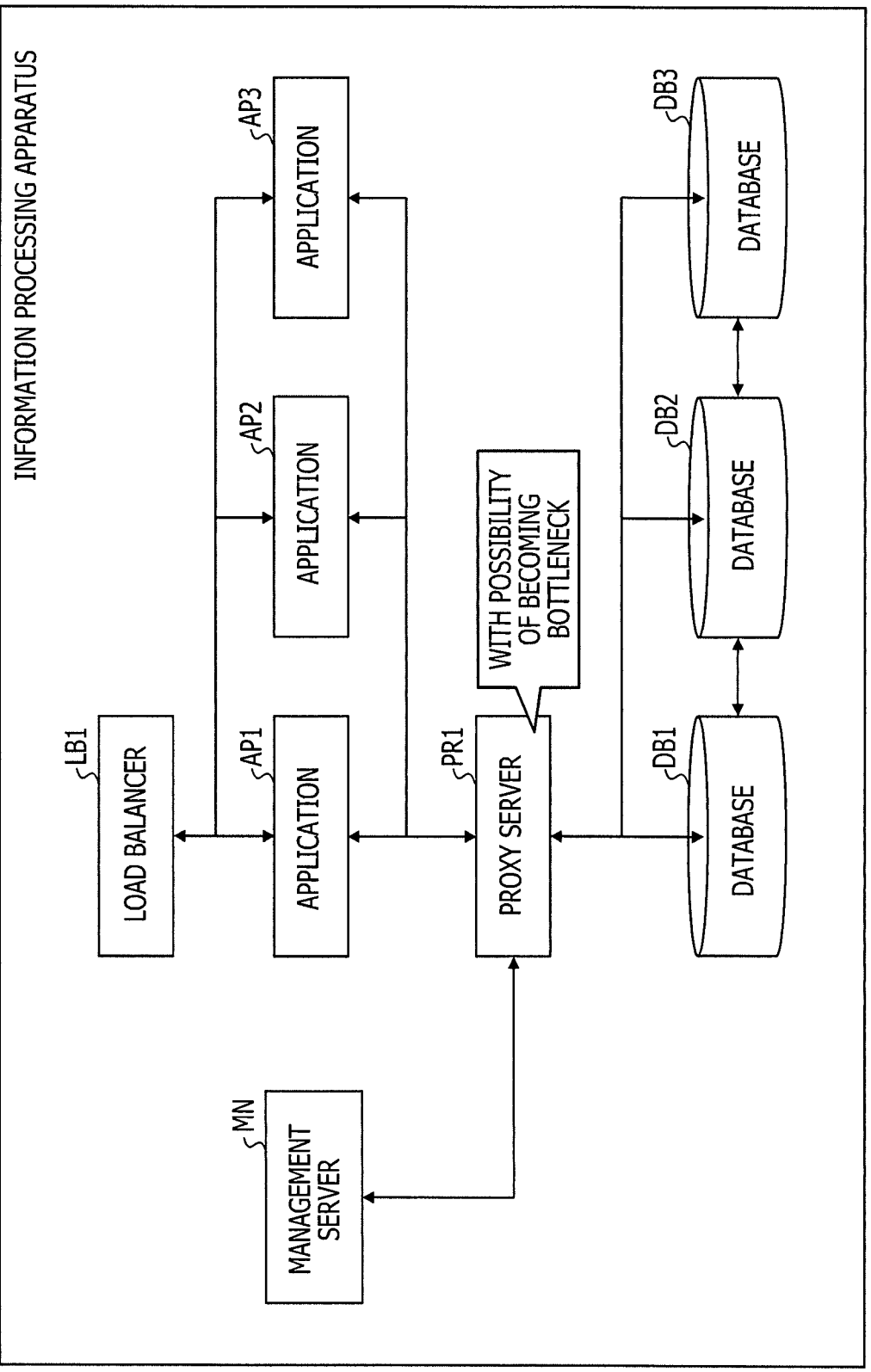
FIG. 2 is a diagram for explaining functions of virtual machines running on an information processing apparatus.
Figure 3:
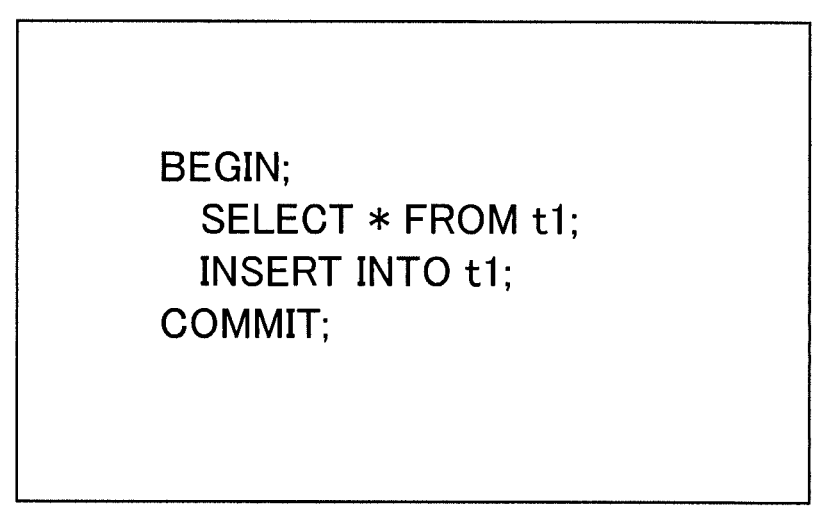
Figure 4:
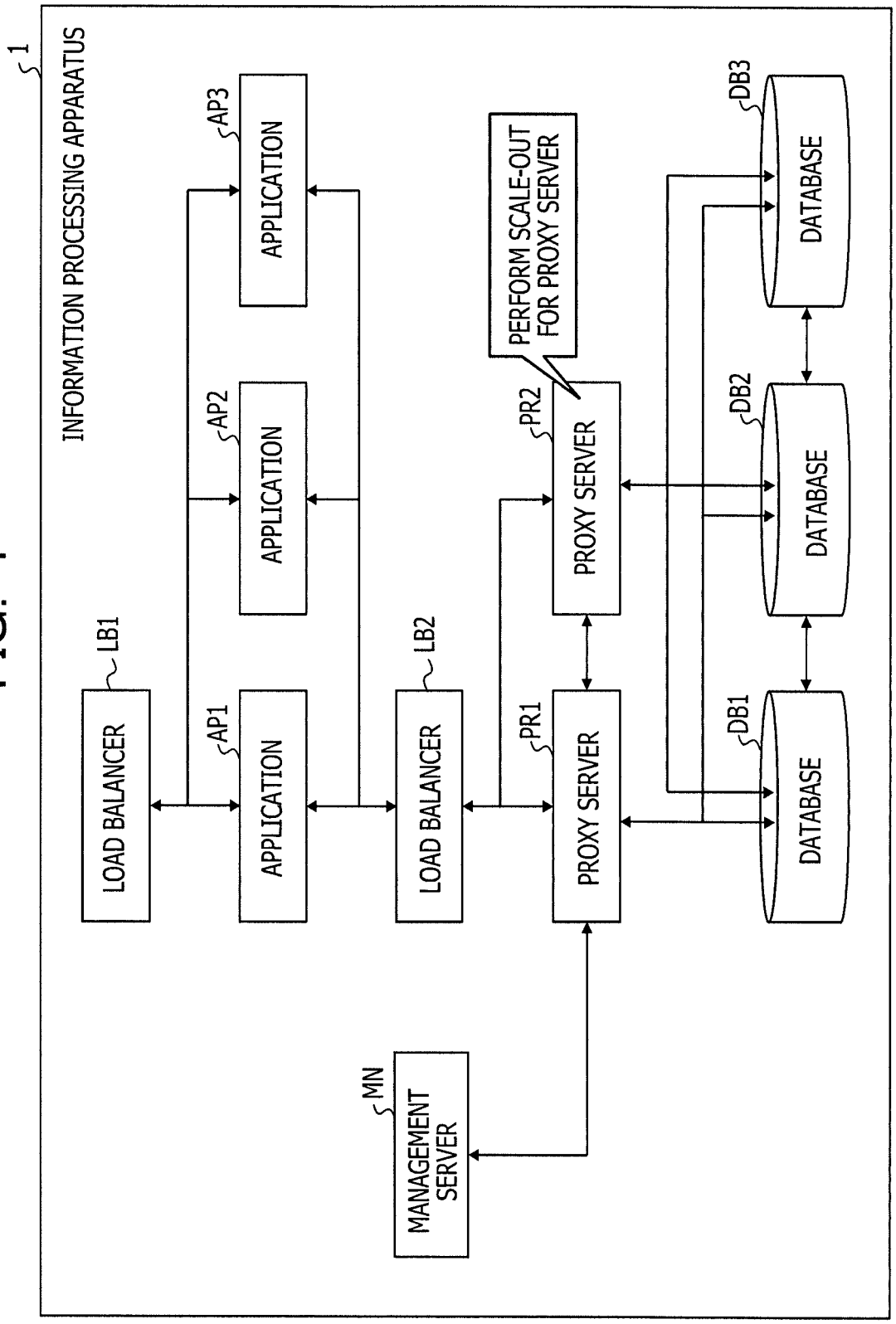
FIG. 4 is a diagram for explaining the functions of the virtual machines running on the information processing apparatus.

Functions of the virtual machines 3 running on the information processing apparatus 1 will be described. FIGS. 2 to 4 are diagrams for explaining the functions of the virtual machines 3 running on the information processing apparatus 1.

The virtual machines 3 running on the information processing apparatus 1 illustrated in FIG. 2 include a management server MN, a load balancer LB1, an application AP1, an application AP2, an application AP3, and a proxy server PR1. The information processing apparatus 1 illustrated in FIG. 2 also includes a database DB1, a database DB2, and a database DB3 which are created in a storage device (not illustrated). Note that the applications AP1, AP2, and AP3 will also be hereinafter collectively referred to as applications AP and that the databases DB1, DB2, and DB3 will also be hereinafter collectively referred to as databases DB. The storage device, in which the databases DB are created, may be, for example, a storage device which is provided outside the information processing apparatus 1.

The load balancer LB1 is a virtual machine which distributes a processing request transmitted via a user terminal (not illustrated) by a user to any one of the applications AP.

The applications AP are virtual machines which execute respective processes corresponding to processing requests distributed by the load balancer LB1 (respective processes for providing services to users). An application AP transmits a query for referring to or updating data stored in a database DB to the database DB at the time of execution of each process.

More specifically, an application AP transmits a plurality of queries (hereinafter also referred to as a query group) including "BEGIN;" that is a query indicating the start of a transaction (hereinafter also referred to as a start query) and "COMMIT;" that is a query indicating the end of the transaction to a database DB, as illustrated in, for example, FIG. 3.

The proxy server PR1 analyzes the content of a query transmitted from an application AP to a database DB and identifies a database DB to handle the query based on a result of the analysis. The proxy server PR1 distributes the query transmitted from the application AP to the identified database DB.

More specifically, the proxy server PR1 distributes each query group surrounded by "BEGIN;" and "COMMIT;" to a corresponding one of the databases DB. For this reason, if a query group transmitted from an application AP is a query group including a query for data reference alone between "BEGIN;" and "COMMIT;", the proxy server PR1 distributes the query group to, for example, a database DB which allows data reference alone. If a query group transmitted from an application AP is a query group including a query for data updating between "BEGIN;" and "COMMIT;", the proxy server PR1 distributes the query group to, for example, a database DB which allows data updating.

The management server MN is a virtual machine which manages the virtual machines 3 running on the information processing apparatus 1. More specifically, the management server MN, for example, monitors the status of processing in each virtual machine 3.

For example, if users' service usage increases temporarily in the information processing apparatus 1 as described above, limits of processing ability in a proxy server (the ability of distributing processes to the databases DB) may become a bottleneck in processing in the information processing apparatus 1.

Under the circumstances, a business operator implements, for example, a function of performing scale-out and scale-in for the proxy server PR1 in the information processing apparatus 1. More specifically, the management server MN generates a proxy server PR2, as illustrated in FIG. 4, if users' service usage increases temporarily. In this case, the management server MN also generates a load balancer LB2 which is a virtual machine configured to distribute queries transmitted from the applications AP between the proxy servers PR1 and PR2 (hereinafter, also simply collectively referred to as proxy servers PR).

The above-described configuration allows the business operator to inhibit the proxy server PR1 from becoming a bottleneck in the information processing apparatus 1.

When scale-in for a proxy server PR is to be performed, the information processing apparatus 1 has to start the scale-in after connections going through the proxy server PR targeted for scale-in of connections between the applications AP and the databases DB are all cut off, in order to inhibit the scale-in for the proxy server PR from affecting transactions in execution. For this reason, the information processing apparatus 1 determines, as a proxy server PR targeted for scale-in, a proxy server PR with the fewest connections going therethrough, for example.

However, a proxy server PR with the shortest time period taken to cut off all connections going therethrough does not necessarily coincide with the proxy server PR with the fewest connections going therethrough. For this reason, if the information processing apparatus 1 determines, as the proxy server PR targeted for scale-in, the proxy server PR with the fewest connections going therethrough, the information processing apparatus 1 may be incapable of quickly performing scale-in for the proxy server PR.

For this reason, a proxy server PR according to the present embodiment refers to transaction execution time periods accumulated for each of the types of the applications AP in response to acceptance of a proxy server PR scale-in instruction and notifies the management server MN of an expected completion time period for transactions in execution in the proxy server PR. The proxy server PR stops acceptance of a request for establishment of a new connection going therethrough and cuts off an active connection going therethrough, a transaction over which is ended, in response to acceptance of a notification that the proxy server PR is selected based on expected completion time periods given from the proxy servers PR. After that, the proxy server PR performs scale-in for the proxy server PR in response to cutoff of all connections going therethrough.

That is, each proxy server PR refers to execution time periods of transactions executed previously and predicts an expected completion time period for transactions currently in execution. The management server MN identifies (predicts) a proxy server PR currently executing transactions, all of which are expected to be completed earliest, based on the expected completion time periods predicted by the proxy servers PR and instructs the identified proxy server PR to perform scale-in. After that, the proxy server PR instructed to perform scale-in performs scale-in for the proxy server PR after all connections going therethrough are cut off.

This allows the information processing apparatus 1 to quickly perform scale-in for a proxy server PR without affecting transactions.

[Hardware Configuration of Information Processing Apparatus 1]

Figure 5:
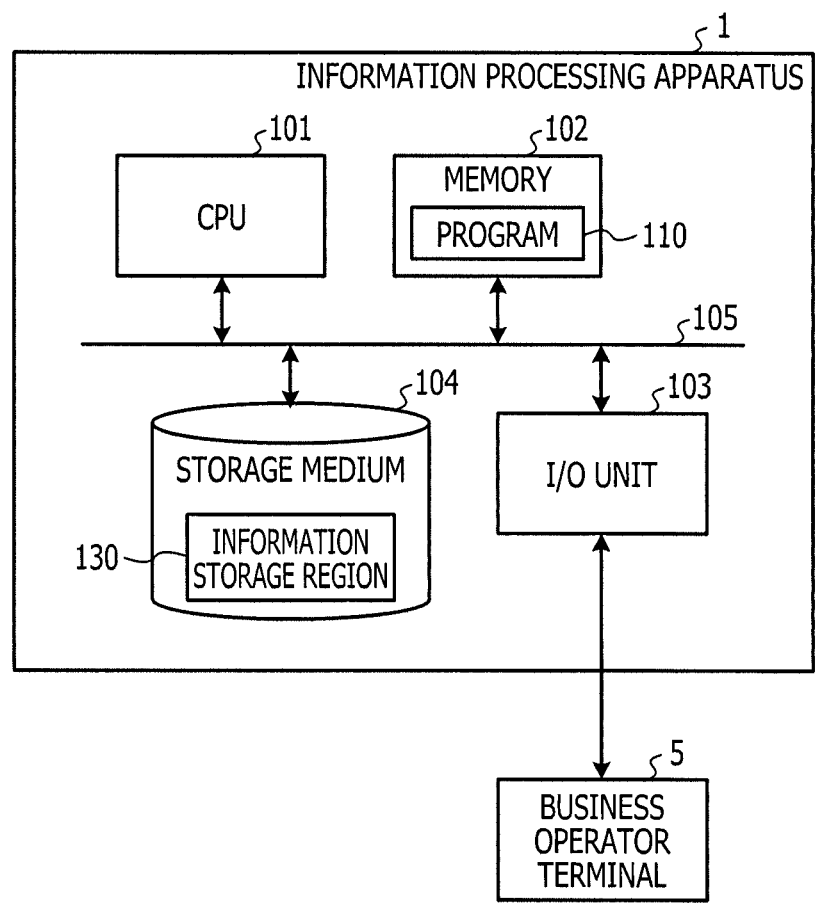
FIG. 5 is a diagram illustrating a hardware configuration of the information processing apparatus.

A hardware configuration of the information processing apparatus 1 will be described. FIG. 5 is a diagram illustrating the hardware configuration of the information processing apparatus 1.

The information processing apparatus 1 includes a CPU 101 which is a processor, a memory 102, an external interface (hereinafter also referred to as an I/O unit) 103, and a storage medium 104. The units are connected to each other via a bus 105.

The storage medium 104 stores a program 110 for performing a process of performing scale-in for a proxy server PR (hereinafter also referred to as scale-in processing) in, for example, a program storage region (not illustrated) inside the storage medium 104. The storage medium 104 also includes, for example, an information storage region 130 (hereinafter also referred to as a storage unit 130) which stores information used at the time of scale-in processing.

The CPU 101 loads the program 110 from the storage medium 104 onto the memory 102 and performs scale-in processing in cooperation with the program 110 at the time of execution of the program 110. The external interface 103 communicates with, for example, the business operator terminal 5.

[Functions of Information Processing Apparatus]

Figure 6:
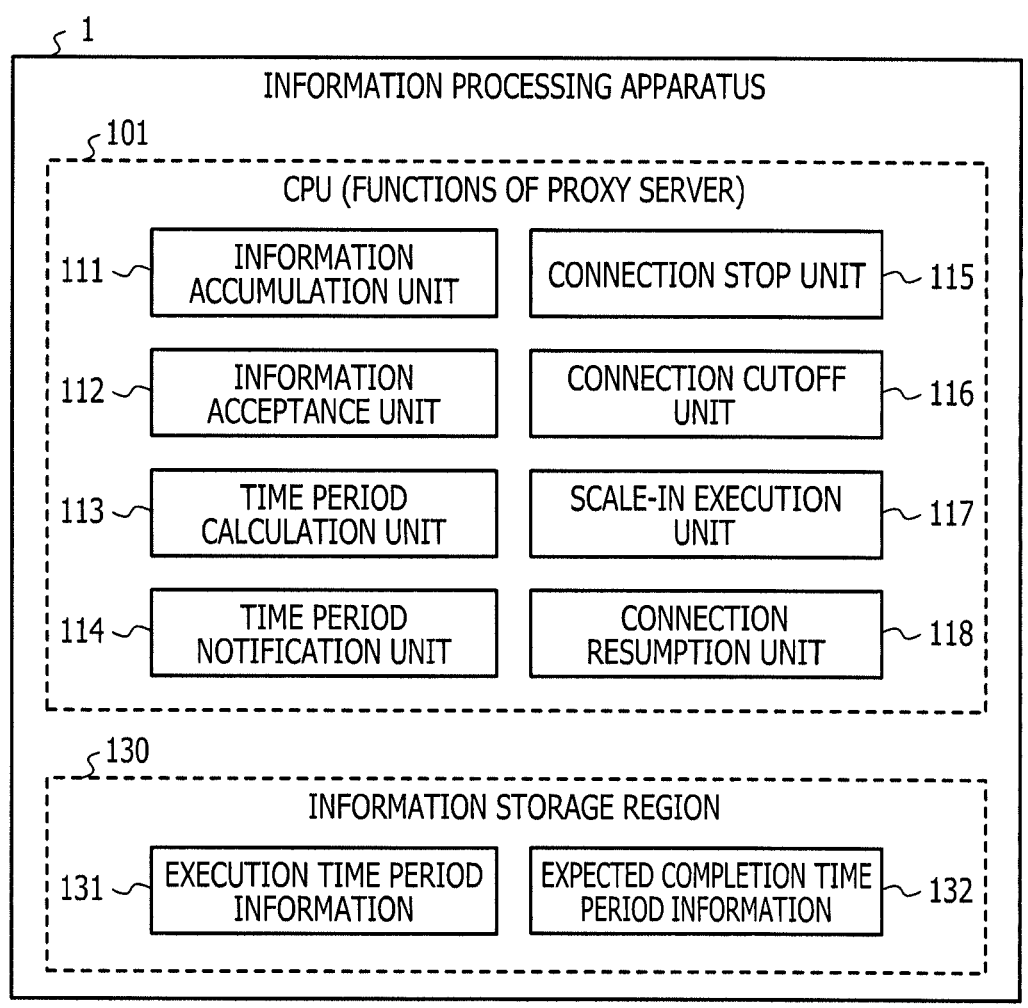
FIG. 6 is a functional block diagram of the information processing apparatus.
Figure 7:
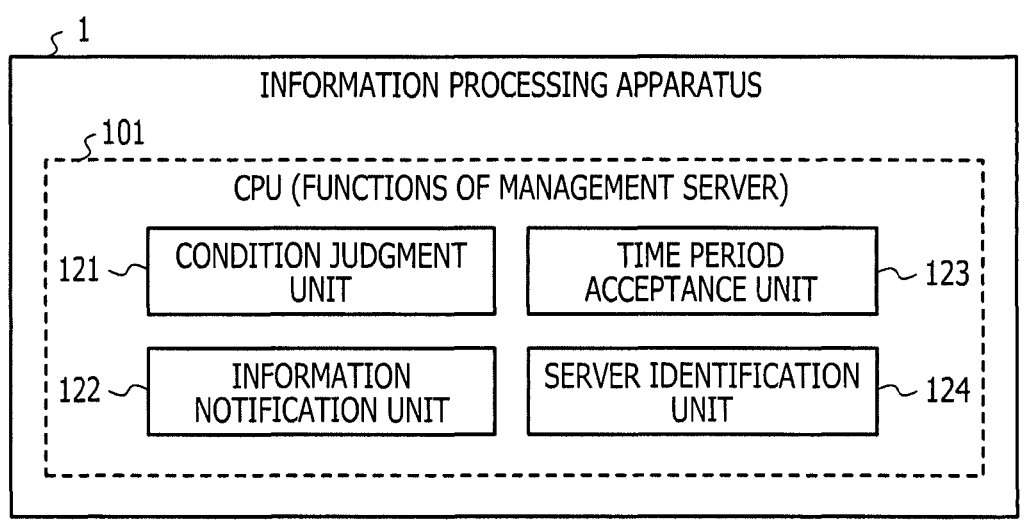
FIG. 7 is a functional block diagram of the information processing apparatus.

Functions of the information processing apparatus 1 will be described. FIGS. 6 and 7 are functional block diagrams of the information processing apparatus 1.

[Functions of Proxy Server]

Of functions of the information processing apparatus 1, ones to be implemented by a proxy server PR (hereinafter also referred to as a scale-in device PR) will be described first. The CPU 101 of the information processing apparatus 1 runs as an information accumulation unit 111, an information acceptance unit 112, a time period calculation unit 113, and a time period notification unit 114 as functions of a proxy server PR, as illustrated in FIG. 6, by working in cooperation with the program 110. The CPU 101 of the information processing apparatus 1 also runs as a connection stop unit 115, a connection cutoff unit 116, a scale-in execution unit 117, and a connection resumption unit 118 as functions of the proxy server PR by working in cooperation with the program 110. Additionally, for example, execution time period information 131 and expected completion time period information 132 are stored in the information storage region 130.

Each time a transaction is executed in the applications AP and the databases DB, the information accumulation unit 111 generates a piece of the execution time period information 131 including a start time and an end time of the transaction and stores the piece in the information storage region 130.

The information acceptance unit 112 accepts a proxy server PR scale-in instruction from the management server MN. That is, the information acceptance unit 112 accepts an instruction indicating that the proxy server PR is a candidate for a target for scale-in in this case.

The information acceptance unit 112 also accepts, from the management server MN, a notification (hereinafter also referred to as a selection notification) indicating that the proxy server PR is selected as a proxy server PR targeted for scale-in based on expected completion time periods given from the proxy servers PR.

The information acceptance unit 112 further accepts, from the management server MN, a notification (hereinafter also referred to as an exclusion notification) indicating that the proxy server PR is not selected as a proxy server PR targeted for scale-in based on expected completion time periods given from the proxy servers PR.

In response to acceptance of a scale-in instruction by the information acceptance unit 112, the time period calculation unit 113 refers to transaction execution time periods accumulated for each of the types of the applications AP and calculates an expected completion time period for transactions in execution in the proxy server PR.

More specifically, the time period calculation unit 113 refers to the execution time period information 131 stored in the information storage region 130 and identifies, for each of the types of the applications AP, a longest execution time period among transaction execution time periods corresponding to the type of the application AP. The time period calculation unit 113 calculates, for each of transactions in execution, a time period obtained by subtracting a time period elapsing from the start of execution of the transaction to the present time from a longest execution time period for the type of an application corresponding to the transaction as an expected completion time period. After that, the time period calculation unit 113 stores, for example, a piece of the expected completion time period information 132 including the calculated expected completion time period in the information storage region 130.

The time period notification unit 114 gives a notification of an expected completion time period calculated by the time period calculation unit 113. More specifically, the time period notification unit 114, for example, calculates a longest expected completion time period among expected completion time periods calculated by the time period calculation unit 113 and gives a notification of the calculated expected completion time period.

The connection stop unit 115 stops acceptance of a request for new connection establishment if the information acceptance unit 112 accepts a selection notification. More specifically, the connection stop unit 115 may, for example, give a notification of intent to stop acceptance of an instruction to establish a new connection to the proxy server PR to the load balancer LB2. The connection stop unit 115 also suspends acceptance of a request for new connection establishment, for example, if the information acceptance unit 112 accepts a scale-in instruction.

The connection cutoff unit 116 cuts off an active connection, a transaction over which is ended, after acceptance of a selection notification by the information acceptance unit 112.

The scale-in execution unit 117 performs scale-in in response to cutoff of all connections after the information acceptance unit 112 accepts a selection notification. In this case, the scale-in execution unit 117 may shut down the proxy server PR to complete the scale-in. The scale-in execution unit 117 may notify the management server MN that the scale-in execution unit 117 performs scale-in for the proxy server PR.

The connection resumption unit 118 resumes suspended acceptance of a request for new connection establishment if the information acceptance unit 112 accepts an exclusion notification.

[Functions of Management Server]

Of the functions of the information processing apparatus 1, ones to be implemented by the management server MN will be described. The CPU 101 of the information processing apparatus 1 runs as a condition judgment unit 121, an information notification unit 122, a time period acceptance unit 123, and a server identification unit 124 as functions of the management server MN, as illustrated in FIG. 7, by working in cooperation with the program 110.

The condition judgment unit 121 judges whether a predetermined condition is met. The predetermined condition is, for example, that CPU utilization by proxy servers PR running on the information processing apparatus 1 exceeds a threshold (a threshold set in advance).

The information notification unit 122 gives a scale-in instruction to each proxy server PR if the condition judgment unit 121 judges that the predetermined condition is met.

The time period acceptance unit 123 accepts an expected completion time period, notification of which is given from each proxy server PR.

For example, in response to acceptance of expected completion time periods from all proxy servers PR by the time period acceptance unit 123, the server identification unit 124 identifies a proxy server targeted for scale-in based on the accepted expected completion time periods. More specifically, the server identification unit 124 identifies, as the proxy server PR targeted for scale-in, a proxy server PR which has notified a shortest expected completion time period among the proxy servers PR that have given notification of the expected completion time periods.

If the server identification unit 124 identifies a proxy server PR targeted for scale-in, the information notification unit 122 gives a selection notification to the proxy server PR identified by the server identification unit 124 among the proxy servers PR that have transmitted expected completion time periods. In this case, the information notification unit 122 also gives an exclusion notification to proxy servers PR not identified by the server identification unit 124 among the proxy servers PR that have transmitted the expected completion time periods.

[Overview of First Embodiment]

Figure 8:
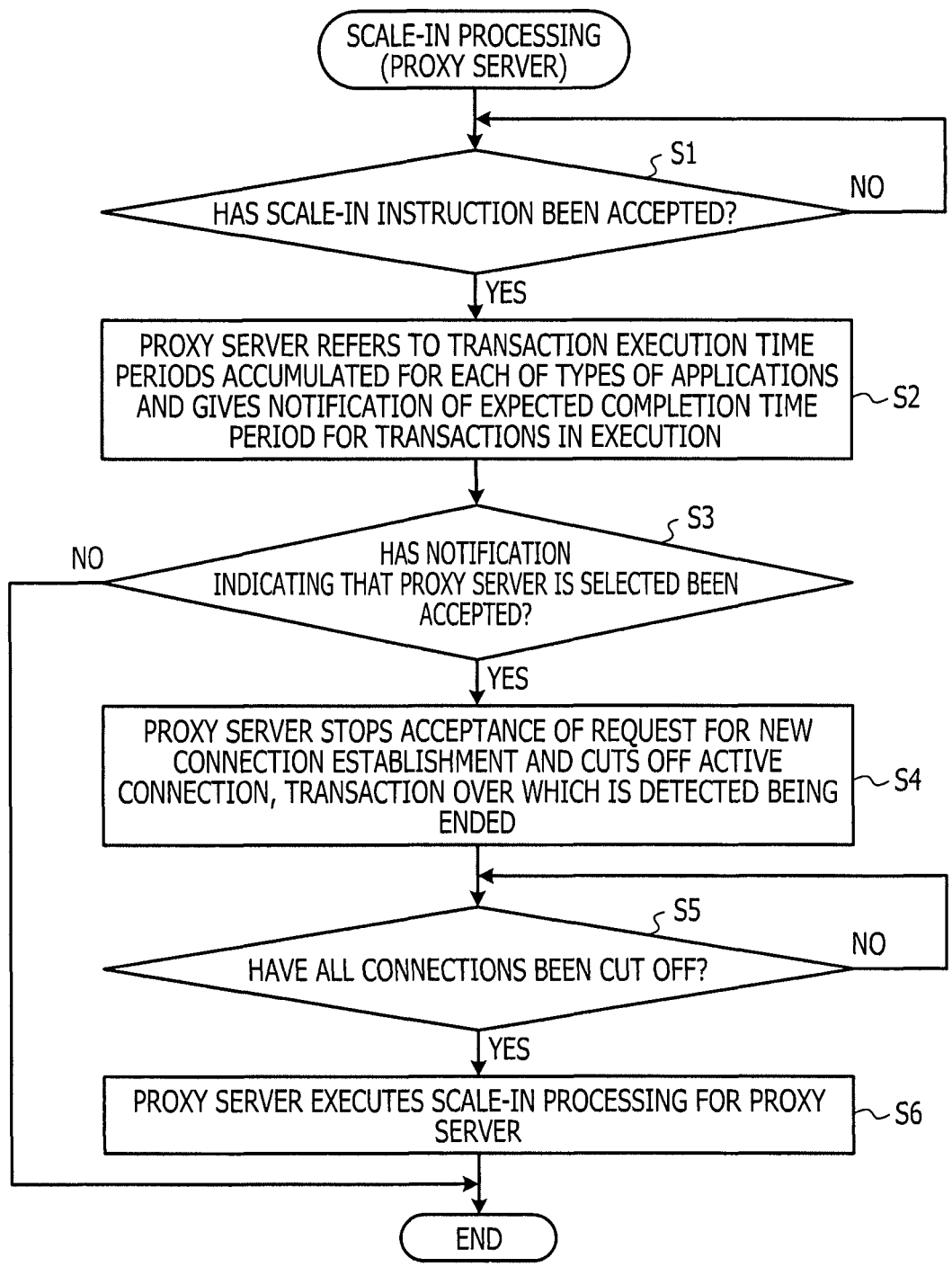
FIG. 8 is a flowchart for explaining an overview of scale-in processing according to a first embodiment.

An overview of a first embodiment will be described. FIG. 8 is a flowchart for explaining an overview of scale-in processing according to the first embodiment. FIGS. 9 to 14 are diagrams for explaining the overview of the scale-in processing according to the first embodiment. The overview of the scale-in processing according to the first embodiment illustrated in FIG. 8 will be described with reference to FIGS. 9 to 14.

Figure 9:
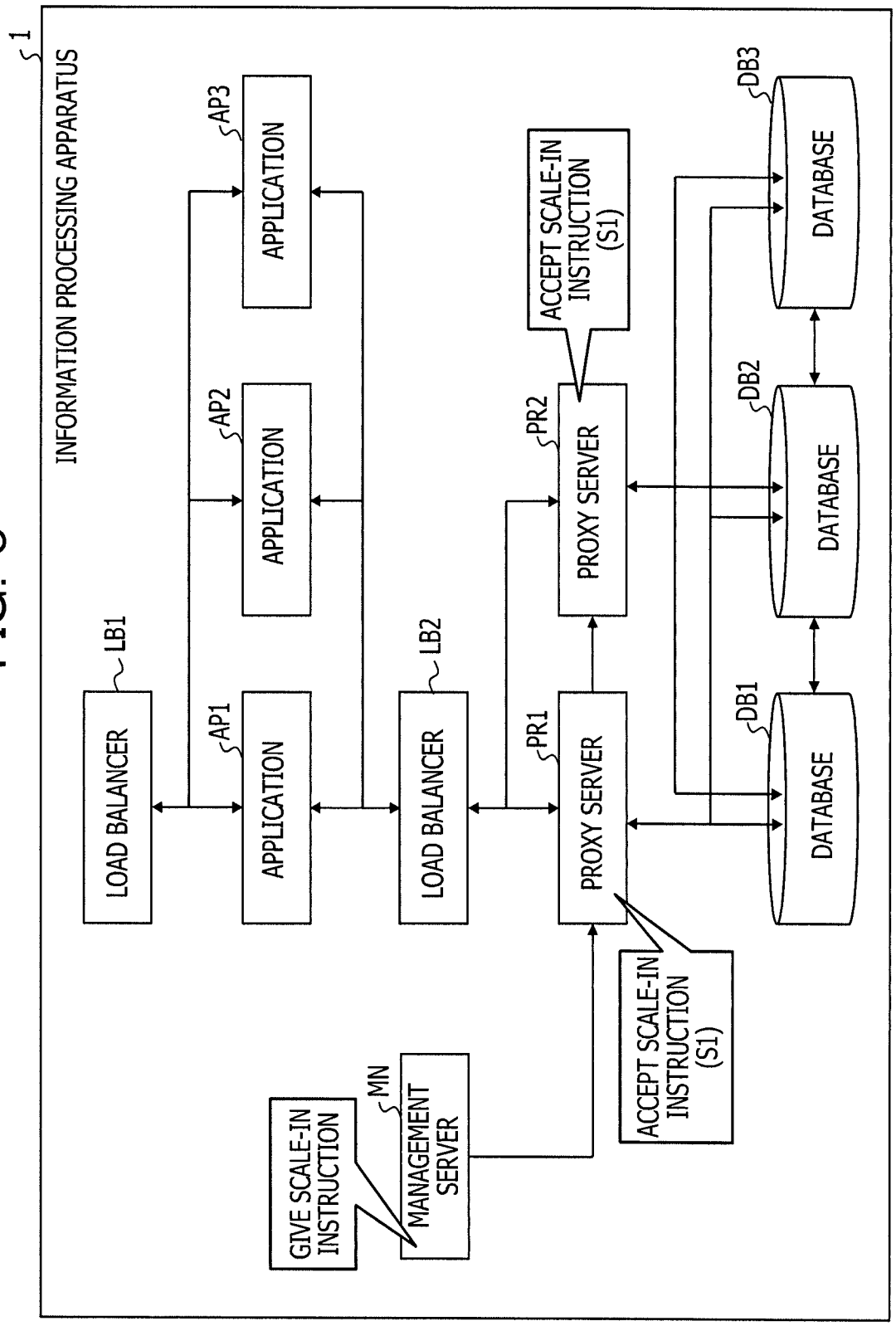
FIG. 9 is a diagram for explaining the overview of the scale-in processing according to the first embodiment.

As illustrated in FIG. 8, each proxy server PR waits until the proxy server PR accepts a scale-in instruction (NO in S1). More specifically, proxy servers PR wait until the proxy servers PR accept respective scale-in instructions from a management server MN, as illustrated in FIG. 9.

Figure 10:
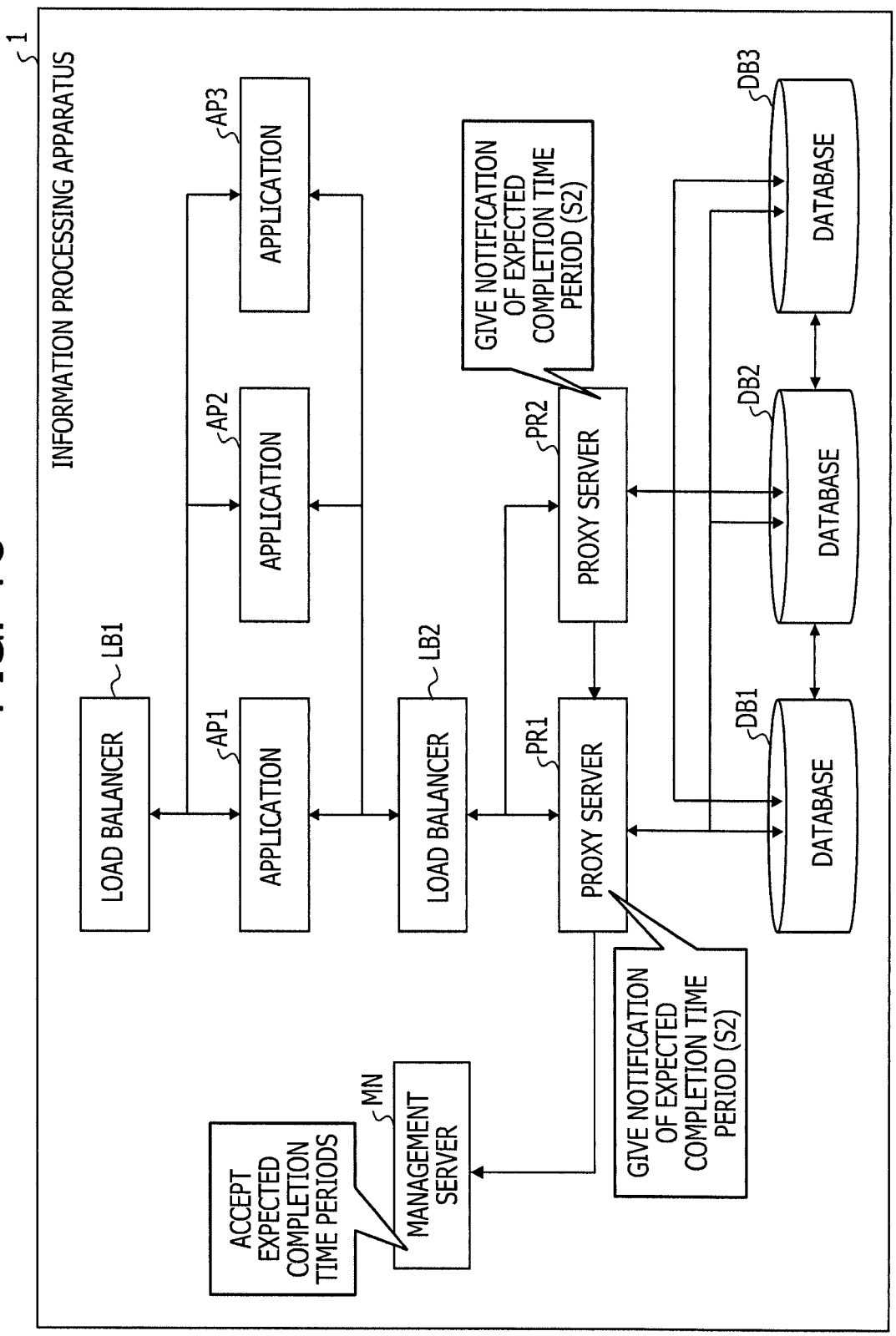
FIG. 10 is a diagram for explaining the overview of the scale-in processing according to the first embodiment.

Upon acceptance of a scale-in instruction (YES in S1), the proxy server PR refers to transaction execution time periods (execution time period information 131) accumulated for each of the types of applications AP and gives notification of an expected completion time period for transactions in execution (S2). More specifically, the proxy servers PR transmit respective calculated expected completion time periods to the management server MN, as illustrated in FIG. 10.

Figure 11:
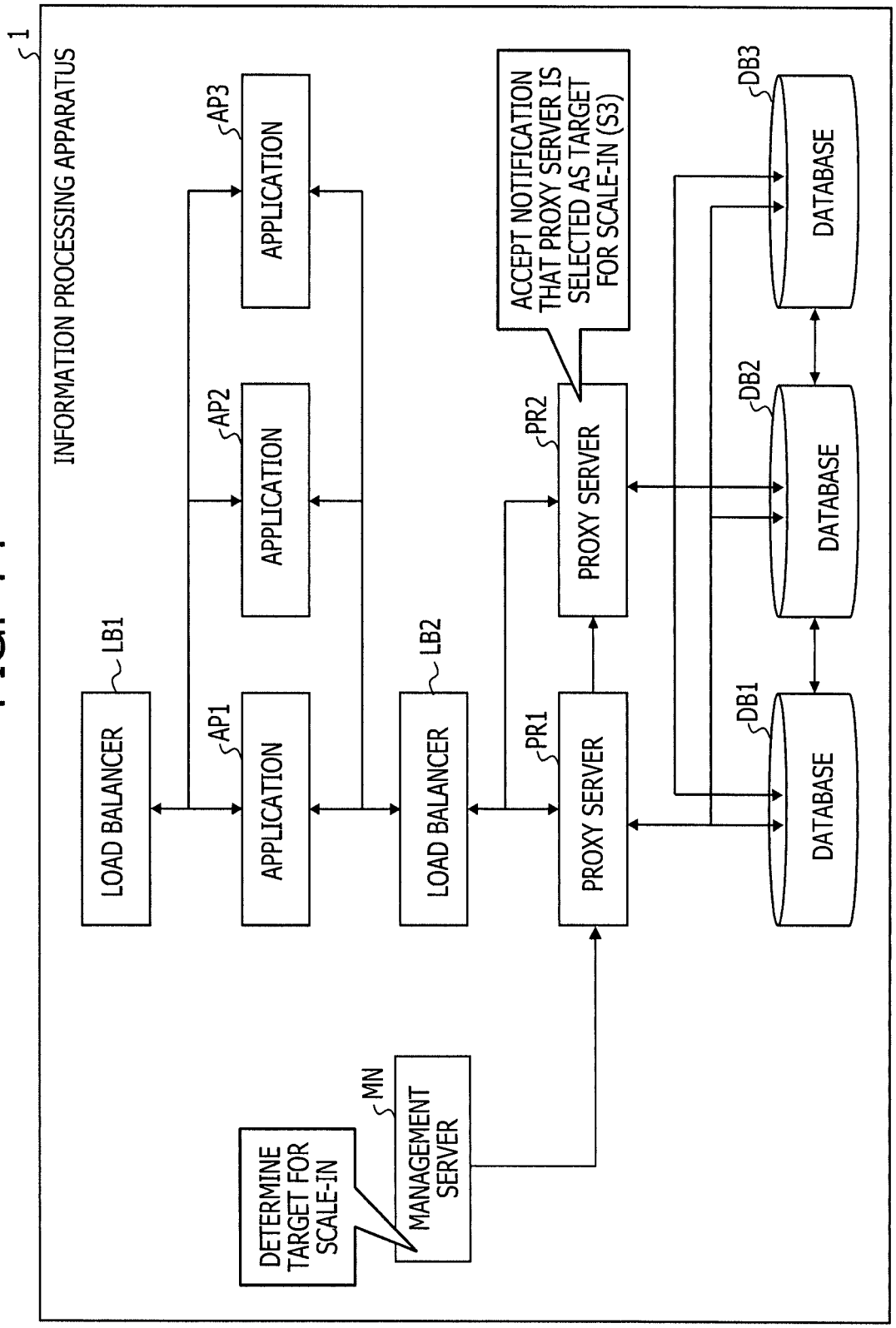
FIG. 11 is a diagram for explaining the overview of the scale-in processing according to the first embodiment.

After that, the proxy server PR waits until the proxy server PR accepts a notification (selection notification) indicating that the proxy server PR is selected as a proxy server PR targeted for scale-in (NO in S3). More specifically, the proxy servers PR wait until the management server MN determines the proxy server PR targeted for scale-in and transmits a selection notification to the determined proxy server PR (a proxy server PR2), as illustrated in FIG. 11.

Figure 12:
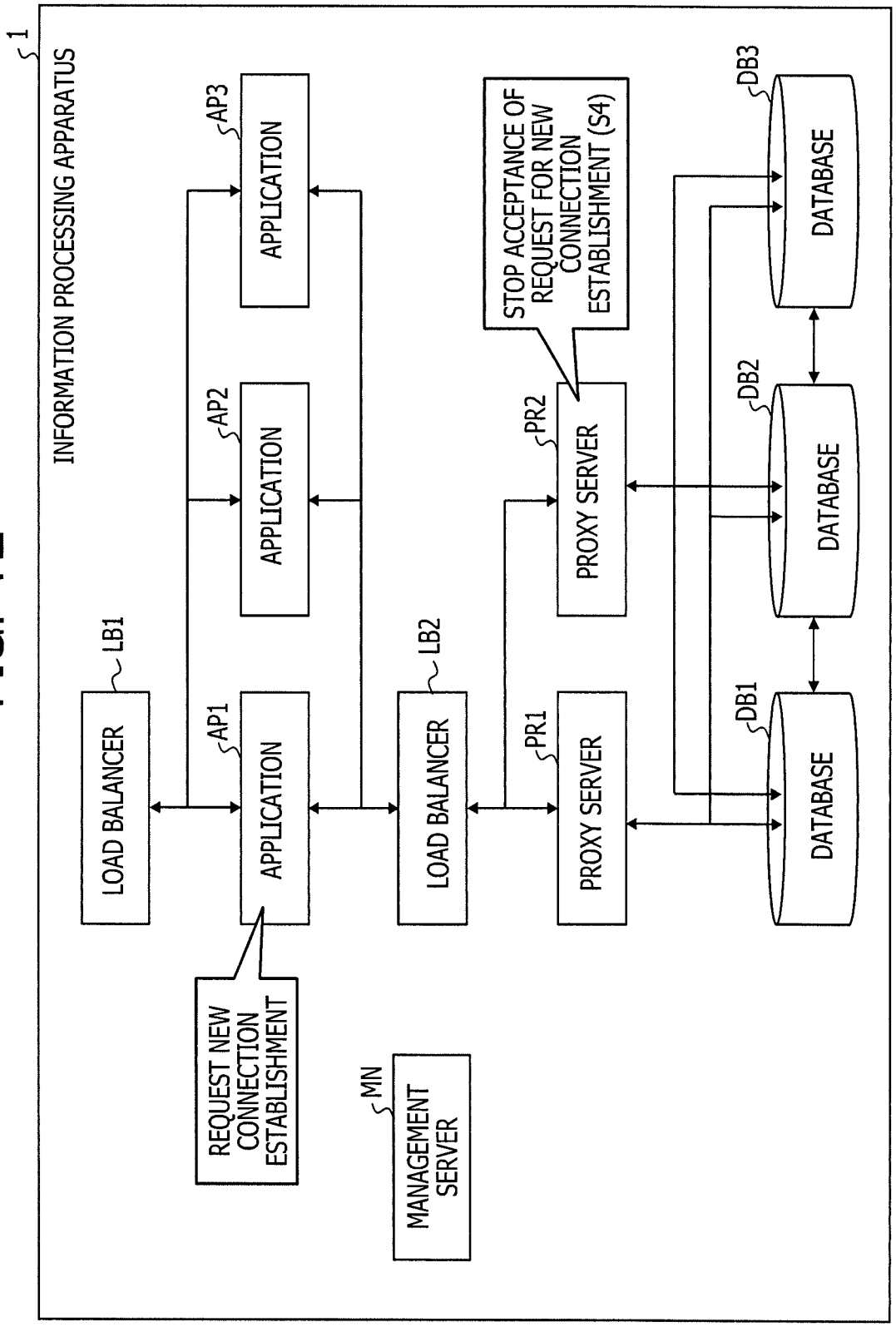
FIG. 12 is a diagram for explaining the overview of the scale-in processing according to the first embodiment.
Figure 13:
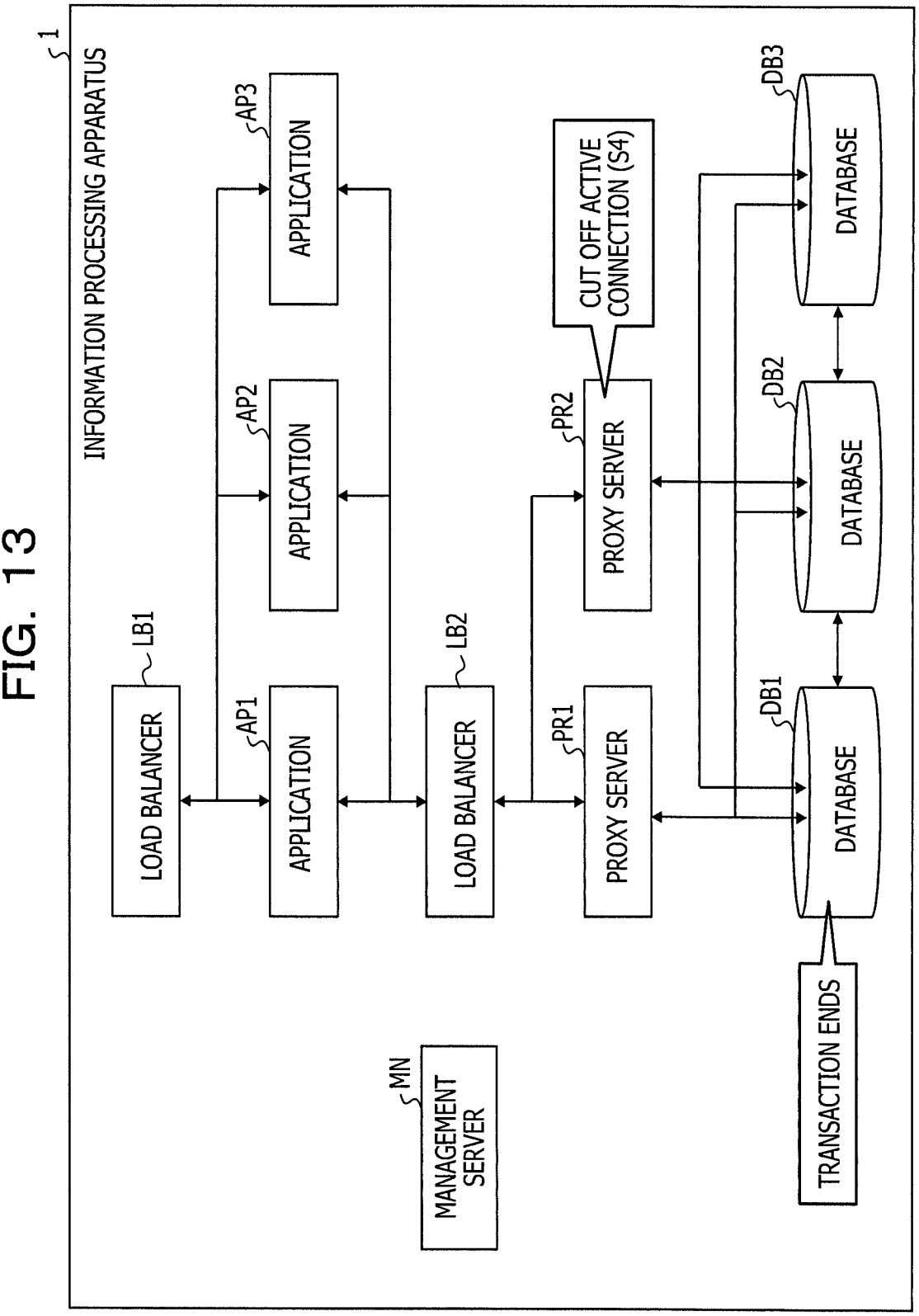
FIG. 13 is a diagram for explaining the overview of the scale-in processing according to the first embodiment.

Upon acceptance of a selection notification (YES in S3), the proxy server PR stops acceptance of a request for new connection establishment and cuts off an active connection, a transaction over which is detected being ended (S4). More specifically, the proxy server PR that has accepted the selection notification does not accept a request for new connection establishment, for example, even if an instruction for new connection establishment is given from an application AP, as illustrated in FIG. 12. The proxy server PR that has accepted the selection notification cuts off the active connection, for example, if the proxy server PR detects that a transaction in execution over the active connection has ended after the acceptance of the selection notification, as illustrated in FIG. 13.

Figure 14:
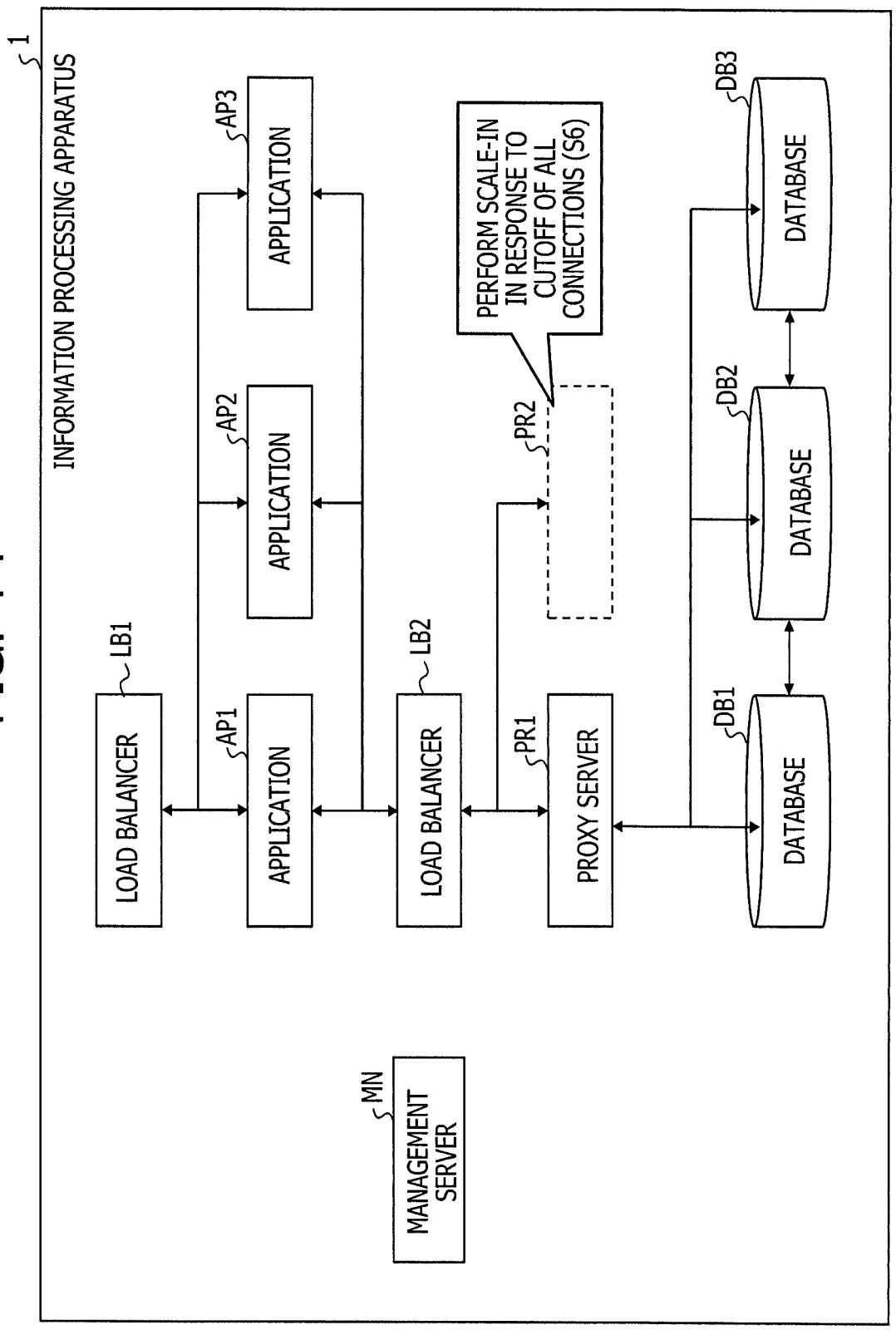
FIG. 14 is a diagram for explaining the overview of the scale-in processing according to the first embodiment.

After that, the proxy server PR waits until all connections are cut off (NO in S5). When all the connections are cut off (YES in S5), the proxy server PR performs scale-in for the proxy server PR (S6). More specifically, the proxy server PR performs scale-in for the proxy server PR in response to the cutoff of all the connections, as illustrated in FIG. 14.

That is, each proxy server PR refers to execution time periods of transactions executed previously and predicts an expected completion time period for transactions currently in execution. The management server MN identifies (predicts) a proxy server PR currently executing transactions, all of which are expected to be completed earliest, based on the expected completion time periods predicted by the proxy servers PR and instructs the identified proxy server PR to perform scale-in. The proxy server PR instructed to perform scale-in performs scale-in for the proxy server PR after all connections going therethrough are cut off.

This allows the information processing apparatus 1 to quickly perform scale-in for a proxy server PR without affecting transactions.

Details of First Embodiment

Details of the first embodiment will be described. FIGS. 15 to 19 are flowcharts for explaining details of the scale-in processing according to the first embodiment. FIGS. 20 to 25 are charts for explaining the details of the scale-in processing according to the first embodiment. The details of the scale-in processing illustrated in FIGS. 15 to 19 will be described with reference to FIGS. 20 to 25.

Information Accumulation Processing

Figure 15:
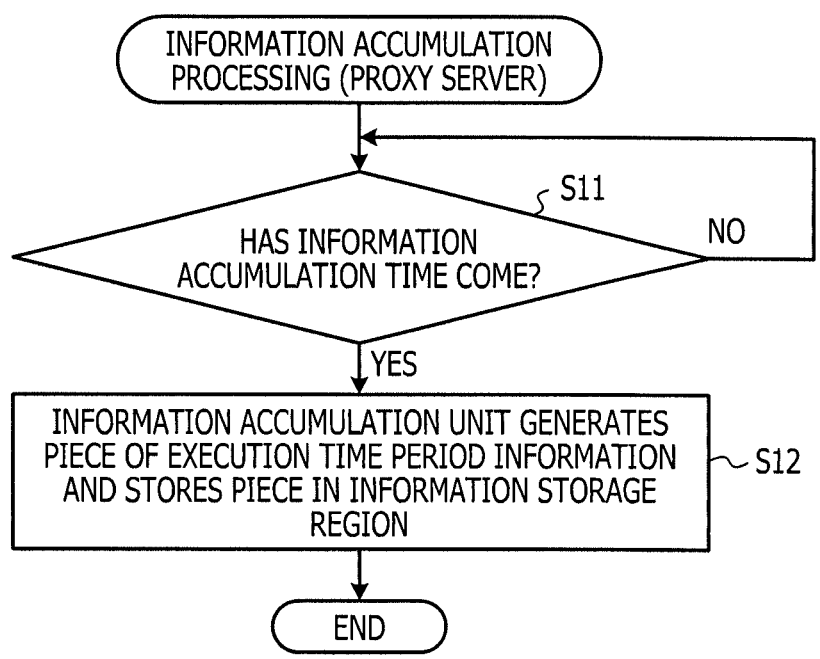
FIG. 15 is a flowchart for explaining details of the scale-in processing according to the first embodiment.

Information accumulation processing which is a preliminary process for the scale-in processing will be described first. The information accumulation processing is a process of generating a piece of the execution time period information 131 and storing the piece in an information storage region 130. FIG. 15 is a flowchart for explaining the information accumulation processing.

An information accumulation unit 111 of a proxy server PR waits for an information accumulation time (NO in S11), as illustrated in FIG. 15. An information accumulation time may be, for example, a time when a start query or an end query is accepted from an application AP.

When an information accumulation time comes (YES in S11), the information accumulation unit 111 generates a piece of the execution time period information 131 and stores the piece in the information storage region 130 (S12). A specific example of the execution time period information 131 will be described below.

Specific Example of Execution Time Period Information

FIGS. 20 to 23 are charts for explaining a specific example of the execution time period information 131.

The execution time period information 131 illustrated in FIG. 20 and the like has, as elements, an item number for identification of each piece of information included in the execution time period information 131, a start time, as which a start time of a transaction is set, and an end time, as which an end time of the transaction is set. The execution time period information 131 illustrated in FIG. 20 and the like also has, as elements, a transmission source for identification of an application AP as a transmission source of a start query or an end query and an execution time period, as which an execution time period of the transaction is set. A time period from a time set as the start time to a time set as the end time is set as the execution time period.

More specifically, in the execution time period information 131 illustrated in FIG. 20, "915148800.00" and "915148801.21" are set as a start time and an end time, respectively, for a piece of information with an item number of "1". In the execution time period information 131 illustrated in FIG. 20, "AP1" (an application AP1) and "1.21" are set as a transmission source and an execution time period, respectively, for the piece of information with the item number of "1".

In the execution time period information 131 illustrated in FIG. 20, "915148800.13" and "915148800.29" are set as a start time and an end time, respectively, for a piece of information with an item number of "2". In the execution time period information 131 illustrated in FIG. 20, "AP2" (an application AP2) and "0.16" are set as a transmission source and an execution time period, respectively, for the piece of information with the item number of "2". A description of the other pieces of information in FIG. 20 will be omitted.

When the information accumulation unit 111 accepts a start query from the application AP2, the information accumulation unit 111 sets, for example, "915148802.40" and "AP1" as a start time and a transmission source, respectively, for a piece of information with an item number of "5" (YES in S11 and S12), as indicated by underlined portions in FIG. 21.

When the information accumulation unit 111 accepts an end query from the application AP2, the information accumulation unit 111 sets, for example, "915148805.34" and "2.94" as an end time and an execution time period, respectively, for the piece of information with the item number of "5" (YES in S11 and S12), as indicated by underlined portions in FIG. 22.

When the information accumulation unit 111 accepts a start query from an application AP3 after that, the information accumulation unit 111 sets, for example, "915148803.30" and "AP3" (an application AP3) as a start time and a transmission source, respectively, for a piece of information with an item number of "6" (YES in S11 and S12), as indicated by underlined portions in FIG. 23. When the information accumulation unit 111 accepts a start query from the application AP1, the information accumulation unit 111 sets, for example, "915148804.80" and "AP1" as a start time and a transmission source, respectively, for a piece of information with an item number of "7" (YES in S11 and S12), as indicated by underlined portions in FIG. 23.

[Scale-In Processing in Management Server (Part 1)]

Figure 16:
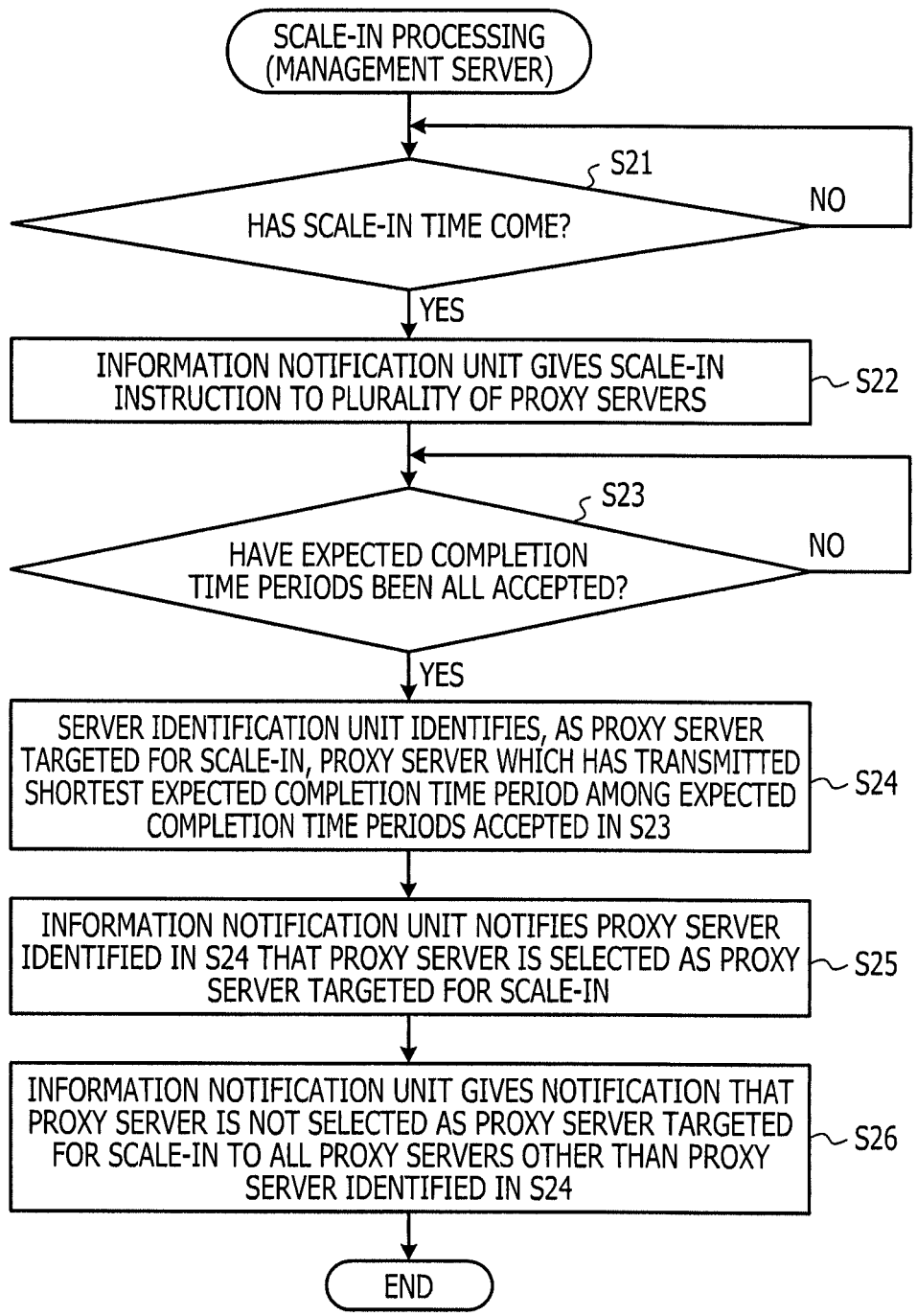
FIG. 16 is a flowchart for explaining the details of the scale-in processing according to the first embodiment.

Details of the scale-in processing will be described. FIG. 16 is a flowchart for explaining scale-in processing in the management server MN.

A condition judgment unit 121 of the management server MN waits for a scale-in time (NO in S21), as illustrated in FIG. 16. More specifically, the condition judgment unit 121 waits, for example, until CPU utilization of the proxy servers PR running on the information processing apparatus 1 exceeds a threshold set in advance.

When a scale-in time comes (YES in S21), an information notification unit 122 of the management server MN gives a scale-in instruction to each proxy server PR (S22). A specific example of scale-in processing in the proxy server PR will be described below. Note that processes in S23 and steps subsequent thereto in FIG. 16 will be described later.

[Scale-In Processing in Proxy Server (Part 1)]

Figure 17:
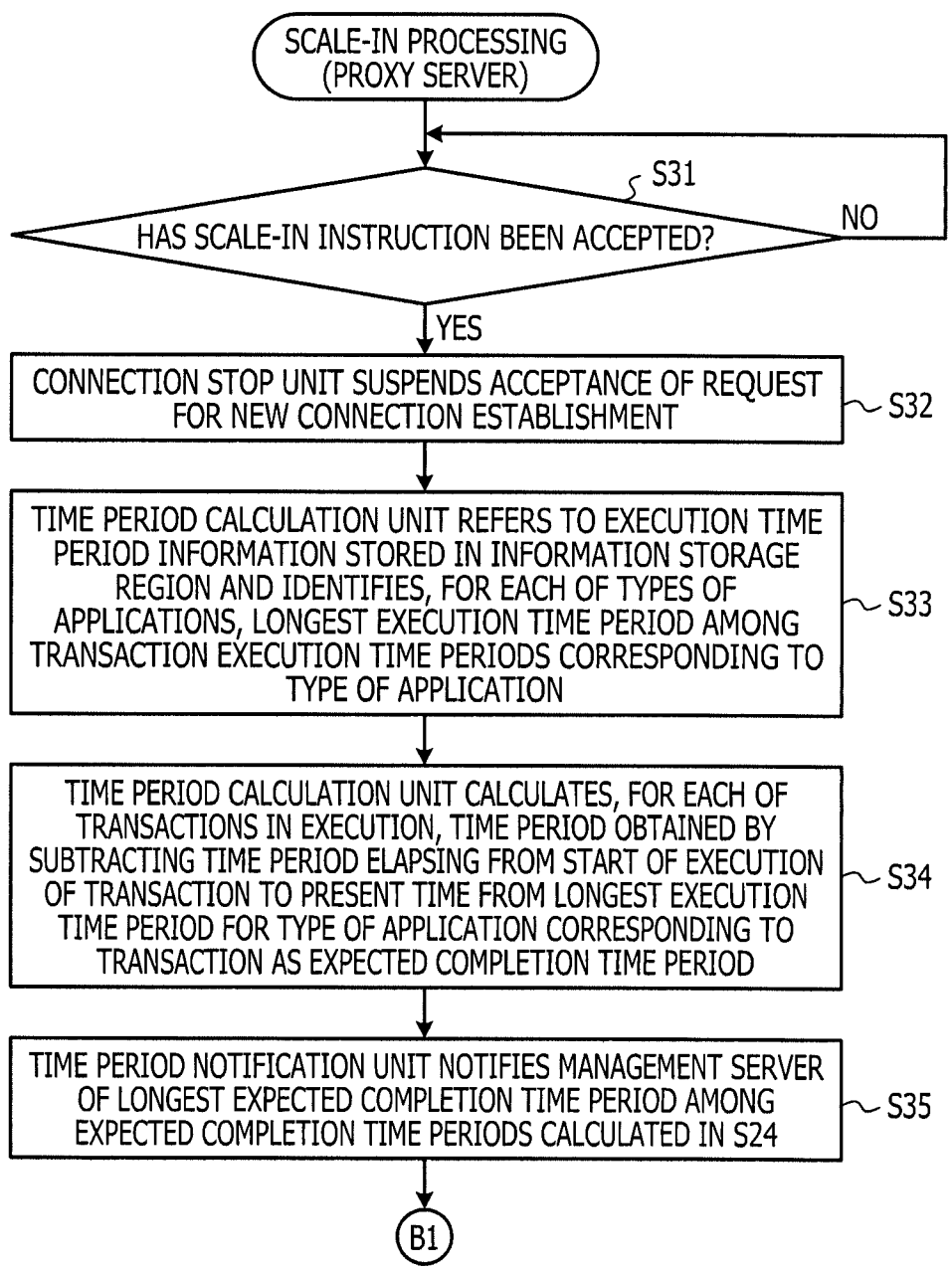
FIG. 17 is a flowchart for explaining the details of the scale-in processing according to the first embodiment.

FIG. 17 is a flowchart for explaining scale-in processing in a proxy server PR.

An information acceptance unit 112 of the proxy server PR waits until the information acceptance unit 112 accepts a scale-in instruction from the management server MN (NO in S31).

Upon acceptance of a scale-in instruction (YES in S31), a connection stop unit 115, for example, suspends acceptance of a request for new connection establishment (S32).

That is, upon acceptance of the scale-in instruction, the connection stop unit 115 judges that the proxy server PR may become a proxy server PR targeted for scale-in. For this reason, the connection stop unit 115 suspends acceptance of a request for new connection establishment in response to the acceptance of the scale-in instruction. This allows the proxy server PR to give a higher priority to calculation of an expected completion time period than to acceptance of a request for new connection establishment.

After that, a time period calculation unit 113 of the proxy server PR refers to the execution time period information 131 stored in the information storage region 130 and identifies, for each of the types of the applications AP, a longest execution time period among transaction execution time periods corresponding to the type of the application AP (S33). More specifically, the time period calculation unit 113, for example, generates longest execution time period information 131a indicating a longest execution time period among transaction execution time periods corresponding to each of the types of the applications AP. A specific example of the longest execution time period information 131a will be described below.

[Specific Example of Longest Execution Time Period Information]

FIG. 24 is a chart for explaining a specific example of the longest execution time period information 131a.

The longest execution time period information 131a illustrated in FIG. 24 has, as elements, an item number for identification of each piece of information included in the longest execution time period information 131a, a transmission source for identification of an application AP, and a longest execution time period, as which a longest transaction execution time period is set.

More specifically, in the execution time period information 131 described with reference to FIG. 23, a longest time period which is set as an execution time period of a piece of information having a transmission source set to "AP1" is "2.94" that is a time period set as an execution time period of a piece of information with an item number of "5". In the execution time period information 131 described with reference to FIG. 23, a longest time period which is set as an execution time period of a piece of information having a transmission source set to "AP2" is "0.16" that is a time period set as an execution time period of a piece of information with an item number of "2". In the execution time period information 131 described with reference to FIG. 23, a longest time period which is set as an execution time period of a piece of information having a transmission source set to "AP3" is "0.54" that is a time period set as an execution time period of a piece of information with an item number of "4".

For this reason, the time period calculation unit 113 sets, for example, "AP1" and "2.94" as a transmission source and a longest execution time period, respectively, of a piece of information with an item number of "1", as illustrated in FIG. 24. The time period calculation unit 113 also sets, for example, "AP2" and "0.16" as a transmission source and a longest execution time period, respectively, of a piece of information with an item number of "2". The time period calculation unit 113 further sets, for example, "AP3" and "0.54" as a transmission source and a longest execution time period, respectively, of a piece of information with an item number of "3".

Referring back to FIG. 17, the time period calculation unit 113 calculates, for each of transactions in execution, a time period obtained by subtracting a time period elapsing from the start of execution of the transaction to the present time from a longest execution time period for the type of an application AP corresponding to the transaction as an expected completion time period (S34). More specifically, the time period calculation unit 113 generates expected completion time period information 132 including an expected completion time period. The time period calculation unit 113 stores the generated expected completion time period information 132 in the information storage region 130. A specific example of the expected completion time period information 132 will be described below.

[Specific Example of Expected Completion Time Period Information]

FIG. 25 is a chart for explaining a specific example of the expected completion time period information 132.

The expected completion time period information 132 illustrated in FIG. 25 has, as elements, an item number for identification of each piece of information included in the expected completion time period information 132, a transmission source for identification of an application AP, an elapsed time period, as which a time period elapsing from the start of a transaction is set, and an expected completion time period, as which an expected completion time period is set.

More specifically, in the longest execution time period information 131a described with reference to FIG. 24, "2.94" is set as a longest execution time period of a piece of information having a transmission source set to "AP1", and "0.54" is set as a longest execution time period of a piece of information having a transmission source set to "AP3". In the execution time period information 131 described with reference to FIG. 23, a piece of information with an item number of "6" and a piece of information with an item number of "7" are included as pieces of information having end times with no set pieces of information (pieces of information on transactions in execution). For the piece of information with the item number of "6", "AP3" is set as a transmission source, and "915148803.30" is set as a start time. For the piece of information with the item number of "7", "AP1" is set as a transmission source, and "915148804.80" is set as a start time.

For this reason, for example, if the current time is "915148805.00", a time period elapsing from the start of a transaction corresponding to the application AP1 is "1.70" that is a time period from "915148803.30" to "915148805.00". In this case, a time period elapsing from the start of a transaction corresponding to the application AP3 is "0.20" that is a time period from "915148804.80" to "915148805.00".

An expected completion time period for the transaction corresponding to the application AP1 is "1.24" that is a time period obtained by subtracting "1.70" from "2.94". An expected completion time period for the transaction in execution corresponding to the application AP3 is "0.34" that is a time period obtained by subtracting "0.20" from "0.54".

Thus, the time period calculation unit 113 sets, for example, "AP1", "1.70", and "1.24" as a transmission source, an elapsed time period, and an expected completion time period, respectively, of a piece of information with an item number of "1", as illustrated in FIG. 25. The time period calculation unit 113 also sets, for example, "AP3", "0.20", and "0.34" as a transmission source, an elapsed time period, and an expected completion time period, respectively, of a piece of information with an item number of "3", as illustrated in FIG. 25.

In the execution time period information 131 described with reference to FIG. 23, there is no piece of information having a transmission source set to "AP2" and an end time with no set piece of information. For this reason, the time period calculation unit 113 sets, for example, "AP2", "−", and "−" as a transmission source, an elapsed time period, and an expected completion time period, respectively, of a piece of information with an item number of "2", as illustrated in FIG. 25. Here, "−" indicates that there is no transaction corresponding to the application AP2.

Referring back to FIG. 17, a time period notification unit 114 of the proxy server PR notifies the management server MN of a longest expected completion time period among the expected completion time periods calculated in the process in S24 (S35).

More specifically, a longest time period among time periods set as expected completion time periods in the expected completion time period information 132 described with reference to FIG. 25 is "1.24" that is a time period set as the expected completion time period of the piece of information with the item number of "1". For this reason, the time period notification unit 114 notifies the management server MN of "1.24". Processing in the management server MN after acceptance of expected completion time periods from the proxy servers PR will be described below. Note that processes in S41 and steps subsequent thereto in FIG. 18 will be described later.

[Scale-In Processing in Management Server (Part 2)]

As illustrated in FIG. 16, a time period acceptance unit 123 of the management server MN waits until the time period acceptance unit 123 accepts expected completion time periods (longest expected completion time periods) from the proxy servers PR (NO in S23). More specifically, the time period acceptance unit 123 waits until the time period acceptance unit 123 accepts respective expected completion time periods from all of the proxy servers PR given the scale-in instruction by the information notification unit 122 in the process in S22.

When the time period acceptance unit 123 accepts the expected completion time periods (YES in S23), a server identification unit 124 of the management server MN identifies, as a proxy server PR targeted for scale-in, a proxy server PR which has transmitted a shortest expected completion time period among the expected completion time periods accepted in the process in S23 (S24).

After that, the information notification unit 122 gives a notification (selection notification) that the proxy server PR is selected as the proxy server PR targeted for scale-in to the proxy server PR identified in the process in S24 (S25). The information notification unit 122 also gives a notification (exclusion notification) that the proxy server PR is not selected as the proxy server PR targeted for scale-in to all proxy servers PR other than the proxy server PR identified in the process in S24 (S26).

This allows each proxy server PR to judge whether the proxy server PR has to perform processing for scale-in. Processing in a proxy server PR after the management server MN accepts expected completion time periods will be described below.

[Scale-In Processing in Proxy Server (Part 2)]

Figure 18:
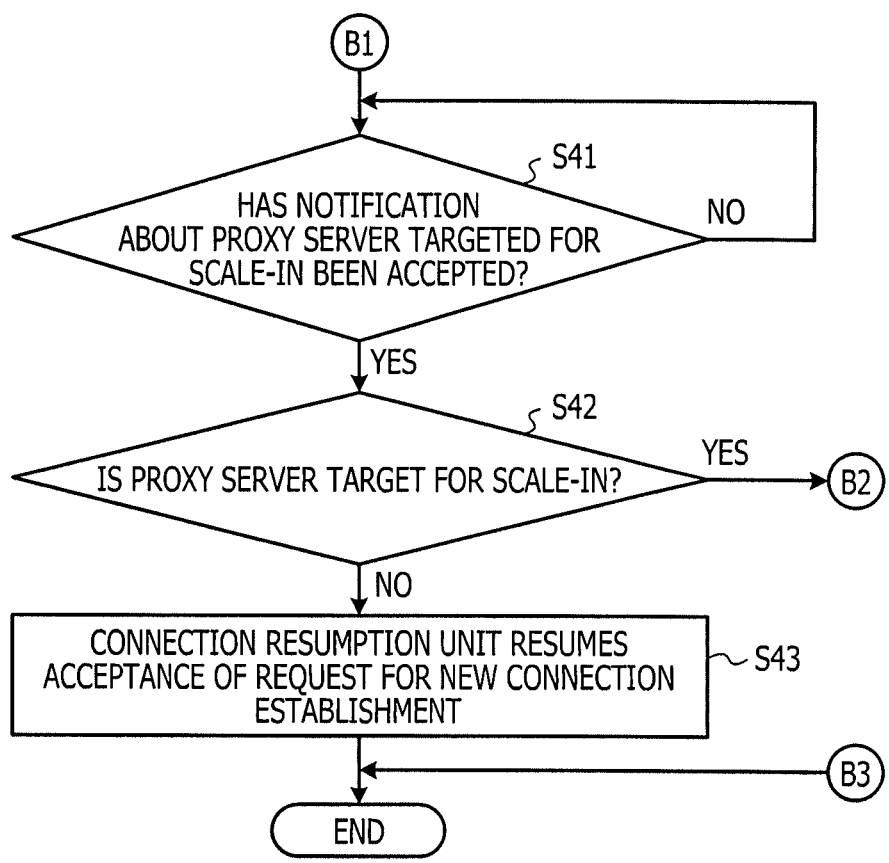
FIG. 18 is a flowchart for explaining the details of the scale-in processing according to the first embodiment.

As illustrated in FIG. 18, the information acceptance unit 112 waits until the information acceptance unit 112 accepts a notification about a proxy server PR targeted for scale-in (NO in S41).

Upon acceptance of a notification about the proxy server PR targeted for scale-in (YES in S41), the information acceptance unit 112 judges whether a notification (selection notification) indicating that the proxy server PR is selected as the proxy server PR targeted for scale-in is accepted (S42).

If a result of the judgment indicates that a notification (exclusion notification) indicating that the proxy server PR is not selected as the proxy server PR targeted for scale-in is accepted (NO in S42), a connection resumption unit 118 of the proxy server PR resumes acceptance of a request for new connection establishment (S43). That is, the proxy server PR resumes acceptance of a request for new connection establishment suspended in the process in S32 when the proxy server PR accepts an exclusion notification.

Note that the connection stop unit 115 may not suspend acceptance of a request for new connection establishment in the process in S32. In this case, the connection resumption unit 118 may not resume acceptance of a request for new connection establishment in the process in S43. That is, the proxy server PR may calculate an expected completion time period without suspending acceptance of a request for new connection establishment. This allows the proxy server PR to respond to a query transmitted from an application AP without delay even at the time of calculation of an expected completion time period.

Figure 19:
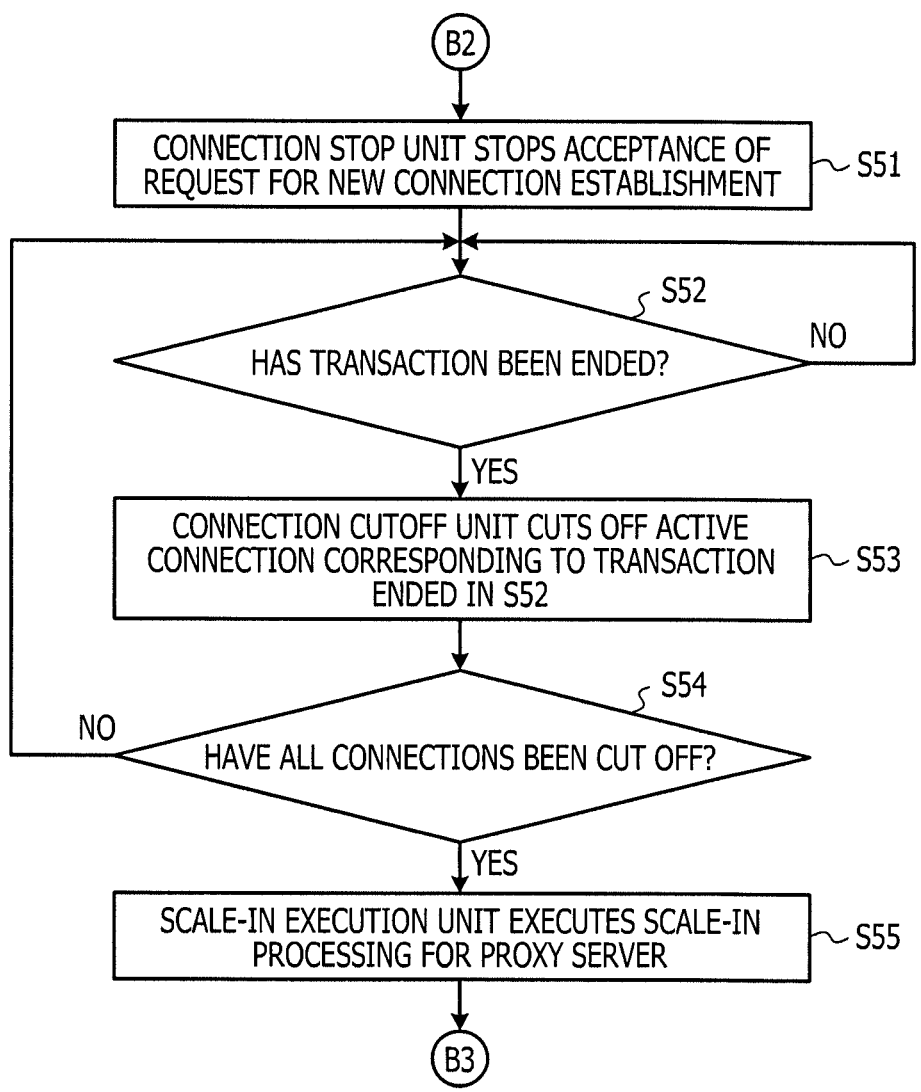
FIG. 19 is a flowchart for explaining the details of the scale-in processing according to the first embodiment.

On the other hand, if it is judged that a selection notification is accepted (YES in S42), the connection stop unit 115 stops acceptance of a request for new connection establishment (S51), as illustrated in FIG. 19. A connection cutoff unit 116 of the proxy server PR waits until a transaction corresponding to any one of the applications AP ends (NO in S52).

When a transaction corresponding to any one of the applications AP is detected being ended after that (YES in S52), the connection cutoff unit 116 cuts off a connection (an active connection) corresponding to the ended transaction (S53).

The connection cutoff unit 116 judges whether all connections going through the proxy server PR are cut off (S54).

If a result of the judgement indicates that all the connections are not cut off (NO in S54), the connection cutoff unit 116 performs the processes in S52 and steps subsequent thereto again.

On the other hand, if it is judged that all the connections are cut off (YES in S54), a scale-in execution unit 117 of the proxy server PR performs scale-in for the proxy server PR. More specifically, in this case, the scale-in execution unit 117 may perform the scale-in for the proxy server PR by notifying the management server MN that the scale-in execution unit 117 performs scale-in for the proxy server PR. Alternatively, the scale-in execution unit 117 may perform the scale-in for the proxy server PR by shutting down the proxy server PR.

As described above, a proxy server PR according to the present embodiment refers to transaction execution time periods accumulated for each of the types of applications AP in response to acceptance of a proxy server PR scale-in instruction and notifies the management server MN of an expected completion time period for transactions in execution in the proxy server PR. The proxy server PR stops acceptance of a request for establishment of a new connection going therethrough and cuts off an active connection going therethrough, a transaction over which is ended, in response to acceptance of a notification indicating that the proxy server PR is selected based on expected completion time periods given from proxy servers PR. After that, the proxy server PR performs scale-in for the proxy server PR in response to cutoff of all connections going therethrough.

That is, each proxy server PR refers to execution time periods of transactions executed previously and predicts an expected completion time period for transactions currently in execution. The management server MN identifies (predicts) a proxy server PR currently executing transactions, all of which are expected to be completed earliest, based on the expected completion time periods predicted by proxy servers PR and instructs the identified proxy server PR to perform scale-in. The proxy server PR instructed to perform scale-in performs scale-in for the proxy server PR after all connections going therethrough are cut off.

This allows the information processing apparatus 1 to quickly perform scale-in for a proxy server PR without affecting transactions.

Note that the information processing apparatus 1 may cause any one of proxy servers PR to perform processing to be performed by the management server MN (the processing described with reference to FIG. 16) of scale-in processing. In this case, for example, the information processing apparatus 1 may identify, as a proxy server PR with the lightest load, a proxy server PR with the fewest connections going therethrough among proxy servers PR running on the information processing apparatus 1 and cause the identified proxy server PR to perform the processing to be performed by the management server MN. This allows the information processing apparatus 1 to reduce a processing load on the management server MN.

Second Embodiment

Figure 26:
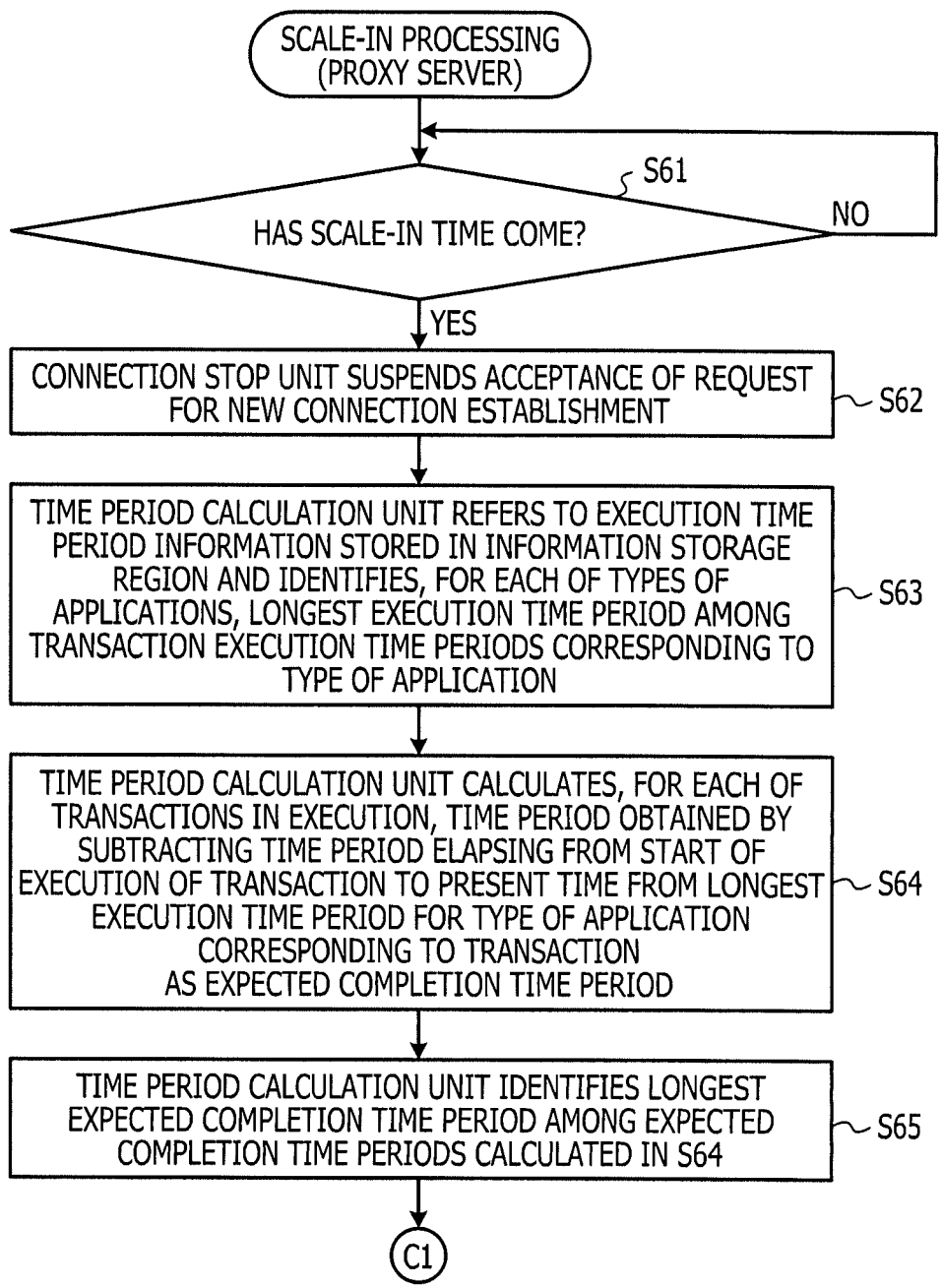
FIG. 26 is a flowchart for explaining scale-in processing according to a second embodiment.
Figure 27:
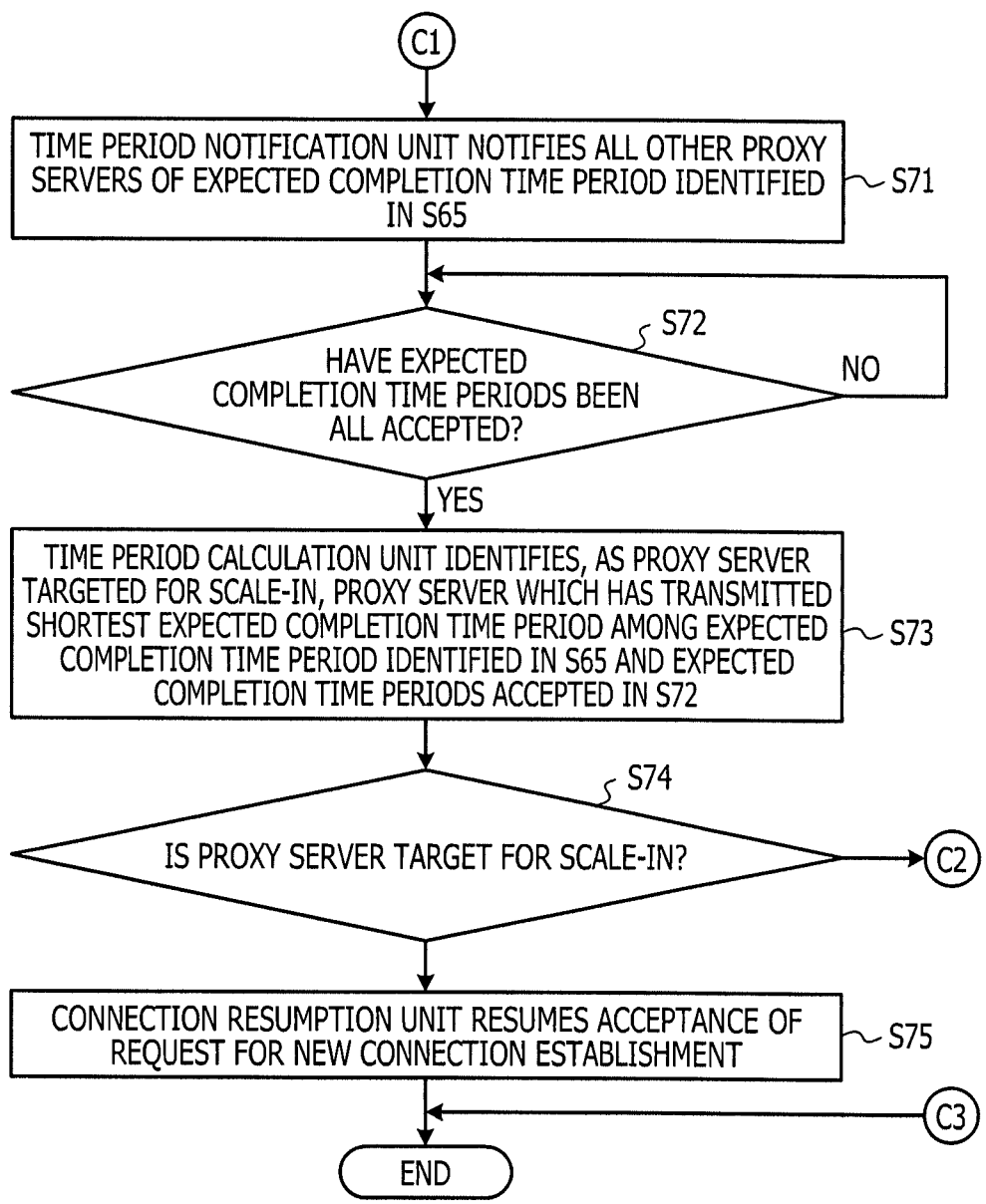
FIG. 27 is a flowchart for explaining the scale-in processing according to the second embodiment.
Figure 28:
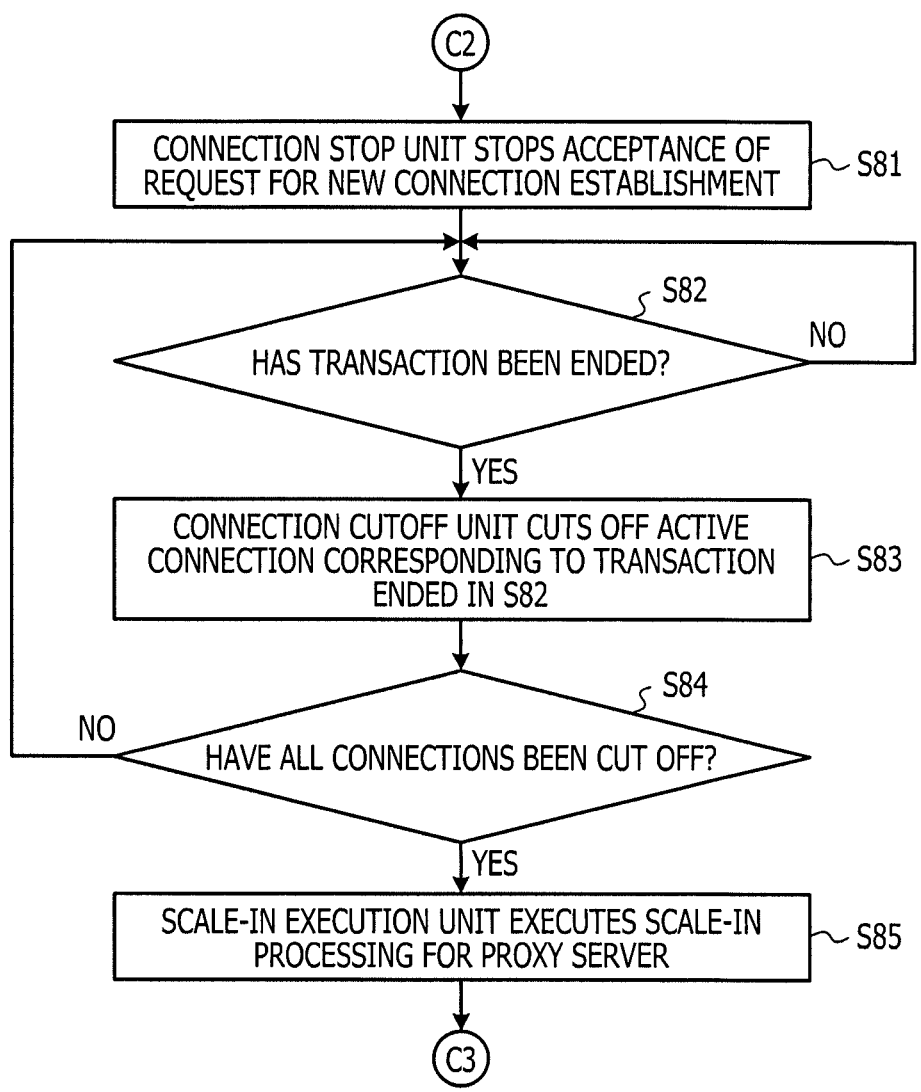
FIG. 28 is a flowchart for explaining the scale-in processing according to the second embodiment.

A second embodiment will be described. FIGS. 26 to 28 are flowcharts for explaining scale-in processing according to the second embodiment.

Proxy servers PR according to the second embodiment transmit and receive an expected completion time period to and from each other and determine a proxy server PR targeted for scale-in. That is, in the scale-in processing according to the second embodiment, the proxy servers PR each determine the proxy server PR targeted for scale-in instead of a management server MN. A proxy server PR which has judged that the proxy server PR is targeted for scale-in performs scale-in for the proxy server PR. This allows an information processing apparatus 1 to reduce a processing load on the management server MN.

The flowcharts of the scale-in processing according to the second embodiment will be described below. Note that information accumulation processing according to the second embodiment is the same as the information accumulation processing according to the first embodiment and that a description thereof will be omitted.

An information acceptance unit 112 waits for a scale-in time (NO in S61), as illustrated in FIG. 26. More specifically, the information acceptance unit 112 waits, for example, until the information acceptance unit 112 accepts, from the management server MN, a piece of information to the effect that CPU utilization of the proxy servers PR running on the information processing apparatus 1 exceeds a threshold set in advance.

When a scale-in time comes (YES in S61), the connection stop unit 115 suspends acceptance of a request for new connection establishment (S62).

After that, a time period calculation unit 113 refers to execution time period information 131 which is stored in an information storage region 130 and identifies, for each of the types of applications AP, a longest execution time period among transaction execution time periods corresponding to the type of the application AP (S63).

The time period calculation unit 113 then calculates, for each of transactions in execution, a time period obtained by subtracting a time period elapsing from the start of execution of the transaction to the present time from a longest execution time period for the type of an application AP corresponding to the transaction as an expected completion time period (S64). The time period calculation unit 113 identifies a longest expected completion time period among the expected completion time periods calculated in the process in S64 (S65).

As illustrated in FIG. 27, a time period notification unit 114 notifies all the other proxy servers PR of the expected completion time period identified in the process in S65 (S71).

The time period calculation unit 113 then waits until the time period calculation unit 113 accepts expected completion time periods from all the other proxy servers PR (NO in S72). More specifically, the time period calculation unit 113 may, for example, refer to a piece of other server information (not illustrated) indicating the other proxy servers PR running currently and judge whether expected completion time periods are accepted from all the other proxy servers PR. In this case, the time period calculation unit 113 may, for example, periodically acquire a piece of other server information from the management server MN and store the piece of information in the information storage region 130.

When the time period calculation unit 113 accepts expected completion time periods from all the other proxy servers PR after that (YES in S72), the time period calculation unit 113 identifies, as a proxy server PR targeted for scale-in, a proxy server PR which has transmitted a shortest expected completion time period among the expected completion time period identified in the process in S65 and the expected completion time periods accepted in the process in S72 (S73).

This allows each proxy server PR to judge whether the proxy server PR has to perform processing for scale-in.

A connection resumption unit 118 then judges whether the proxy server PR targeted for scale-in identified in the process in S73 is the proxy server PR (S74).

If a result of the judgment indicates that the proxy server PR targeted for scale-in identified in the process in S73 is not the proxy server PR (NO in S74), the connection resumption unit 118 resumes acceptance of a request for new connection establishment (S75). That is, in this case, the proxy server PR resumes acceptance of a request for new connection establishment suspended in the process in S62.

On the other hand, if it is judged that the proxy server PR targeted for scale-in identified in the process in S73 is the proxy server PR (YES in S74), a connection stop unit 115 stops acceptance of a request for new connection establishment (S81), as illustrated in FIG. 19. A connection cutoff unit 116 then waits until a transaction corresponding to one of the applications AP ends (NO in S82).

When a transaction corresponding to one of the applications AP is detected being ended after that (YES in S82), the connection cutoff unit 116 cuts off an active connection corresponding to the ended transaction (S83).

The connection cutoff unit 116 then judges whether all connections going through the proxy server PR are cut off (S84).

If a result of the judgment indicates that all the connections are not cut off (NO in S84), the connection cutoff unit 116 performs the processes in S82 and steps subsequent thereto again. On the other hand, if it is judged that all the connections are cut off (YES in S84), a scale-in execution unit 117 of the proxy server PR performs scale-in for the proxy server PR (S85).

This allows the information processing apparatus 1 to reduce a processing load on the management server MN.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device comprising:
   a memory; and
   a processor coupled to the memory and the processor configured to:
   transmit a first instruction to proxy servers;
   receive, from each of the proxy servers, each of a plurality of expected completion times for each transaction executed by each of the proxy servers;
   perform a selection of a first proxy server corresponding to an earliest expected completion time among the plurality of expected completion times;
   transmit a second instruction to the first proxy server indicating that the first proxy server is selected so that the first proxy server executes scale-in processing of the first proxy server when the transaction executed by the first proxy server ends; and
   transmit a notification, to one or more proxy servers other than the first proxy server in the proxy servers, indicating that the one or more proxy servers are not selected so that the one or more proxy servers resume suspended acceptance of a request for new connection establishment in response to the notification.

2. The management device according to claim 1, wherein each of the plurality of expected completion times is determined in accordance with transaction execution times that are accumulated for each type of applications.

3. The management device according to claim 2, wherein each of the plurality of expected completion times is determined on the basis of a time period obtained by subtracting an elapsing time from a start of execution of each the transaction to a present time from a longest execution time among the transaction execution times accumulated for each type of the applications in each of the proxy servers.

4. The management device according to claim 1, wherein the second instruction is a notification indicating that the first proxy server is selected as a target for scale-in.

5. The management device according to claim 1, wherein each of the proxy servers suspends new connection establishment when receiving the first instruction.

6. The management device according to claim 5, wherein the first proxy server stops acceptance of a request for new connection establishment when receiving the second instruction, cuts off an active connection when it is detected that the transaction has been ended, and executes the scale-in processing after cutting off the active connection.

7. The management device according to claim 1, wherein the management device is a proxy server,
   the processor is further configured to calculate a first expected completion time for a transaction in execution in the management device on the basis of each transaction execution time that is accumulated for each type of applications, and
   the selection is a process of selecting the first proxy server from among the management device and the proxy servers on the basis of the first expected completion time and the plurality of expected completion times.

8. A management method executed by a computer, the method comprising:
   specifying each of a plurality of expected completion times for each transaction executed by each of proxy servers;
   selecting a first proxy server corresponding to an earliest expected completion time among the plurality of expected completion times;
   prohibiting the first proxy server from accepting a request for new connection establishment when receiving a second instruction which indicates that the first proxy server is selected and instructs the first proxy server to execute scale-in processing of the first proxy server when the transaction executed by the first proxy server ends;
   transmitting a notification, to one or more proxy servers other than the first proxy server in the proxy servers, indicating that the one or more proxy servers are not selected so that the one or more proxy servers resume suspended acceptance of a request for new connection establishment in response to the notification; and
   performing the scale-in processing of the first proxy server in response to termination of the transaction executed by the first proxy server.

9. The management method according to claim 8, wherein each of the plurality of expected completion times is determined in accordance with each of transaction execution times that are accumulated for each type of applications.

10. The management method according to claim 9, wherein each of the plurality of expected completion times is determined on the basis of a time period obtained by subtracting an elapsing time from a start of execution of each the transaction to a present time from a longest execution time among the transaction execution times accumulated for each type of the applications in each of the proxy servers.

11. The management method according to claim 10, further comprising, prior to the selecting, causing the proxy servers to suspend new connection establishment.

12. The management method according to claim 11, further comprising, cutting off an active connection in the first proxy server when detecting that the transaction has been ended.

13. A non-transitory computer-readable medium storing a management program that causes a computer to execute a process comprising:
   specifying each of a plurality of expected completion times for each transaction executed by each of proxy servers;
   selecting a first proxy server corresponding to an earliest expected completion time among the plurality of expected completion times;

prohibiting the first proxy server from accepting a request for new connection establishment when receiving a second instruction which indicates that the first proxy server is selected and instructs the first proxy server to execute scale-in processing of the first proxy server when the transaction executed by the first proxy server ends;

transmitting a notification, to one or more proxy servers other than the first proxy server in the proxy servers, indicating that the one or more proxy servers are not selected so that the one or more proxy servers resume suspended acceptance of a request for new connection establishment in response to the notification; and performing the scale-in processing of the first proxy server in response to termination of the transaction executed by the first proxy server.

14. The non-transitory computer-readable medium according to claim 13, wherein each of the plurality of expected completion times is determined on the basis of execution time of transactions which has been executed by each of proxy servers.

15. The non-transitory computer-readable medium according to claim 13, wherein each of the proxy servers is configured to distribute a query transmitted from an application to one of databases.

16. The non-transitory computer-readable medium according to claim 13, further comprising: cutting off an active connection in the first proxy server when detecting that the transaction has been ended.

* * * * *